US012536550B2

(12) United States Patent
Knowlton, III et al.

(10) Patent No.: US 12,536,550 B2
(45) Date of Patent: Jan. 27, 2026

(54) INTEGRATED GLOBAL TOKENIZATION SYSTEM

(71) Applicant: FreedomPay, Inc., Philadelphia, PA (US)

(72) Inventors: David Otis Knowlton, III, Wilmington, DE (US); Paul Keith Snelling, Fareham (GB)

(73) Assignee: FREEDOMPAY, INC., Philadelphia, PA (US)

( * ) Notice: Subject to any disclaimer, the term of this patent is extended or adjusted under 35 U.S.C. 154(b) by 0 days.

(21) Appl. No.: 18/640,420

(22) Filed: Apr. 19, 2024

(65) Prior Publication Data
US 2024/0354769 A1    Oct. 24, 2024

Related U.S. Application Data

(60) Provisional application No. 63/461,073, filed on Apr. 21, 2023.

(51) Int. Cl.
*G06Q 20/40* (2012.01)

(52) U.S. Cl.
CPC ..... *G06Q 20/4093* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 8,046,256 B2 * | 10/2011 | Chien | ................... | G06Q 20/10 705/14.33 |
| 11,049,085 B2 | 6/2021 | Oberholtzer et al. | | |

(Continued)

FOREIGN PATENT DOCUMENTS

| | | | | |
|---|---|---|---|---|
| KR | 101708697 B1 * | 2/2017 | ........... | G06Q 20/027 |
| WO | WO-2004049298 A1 * | 6/2004 | ............. | G06Q 20/10 |

OTHER PUBLICATIONS

R. Abdellaoui and M. Pasquet, "Secure Communication for Internet Payment in Heterogeneous Networks," 2010 24th IEEE International Conference on Advanced Information Networking and Applications, Perth, WA, Australia, 2010, pp. 1085-1092, doi: 10.1109/AINA.2010.45. (Year: 2010).*

(Continued)

*Primary Examiner* — Eduardo Castilho
(74) *Attorney, Agent, or Firm* — CANTOR COLBURN LLP

(57) ABSTRACT

An integrated selling system platform includes a point-of-sale application and middleware to perform global tokenization orchestration, that in combination, provide credit card reading device agnostic global token and provisioning operations. The middleware includes communication interfaces, each of which corresponds to a particular communication protocol. The middleware receives a token create request from the point of sale application and directly communicates, via one of the communication protocols, to a point-of-interaction payment device, to receive and securely encrypt the credit card number, then transmit that information to a hosted network token provisioning system to request a network token. Upon receiving the network token, the middleware communicates directly, via one or more protocols, to a global merchant tokenization host, to create a merchant specific token, to be returned by the middleware back to the point-of-sale client to use as a card-on-file payment method.

19 Claims, 12 Drawing Sheets

(56) References Cited

U.S. PATENT DOCUMENTS

| | | | | |
|---|---|---|---|---|
| 2006/0294005 A1* | 12/2006 | Drepak | ............... | G06Q 20/381 |
| | | | | 705/39 |
| 2008/0059303 A1* | 3/2008 | Fordyce | ............ | G06Q 30/0223 |
| | | | | 705/14.27 |
| 2012/0016731 A1* | 1/2012 | Smith | .................... | G06Q 20/20 |
| | | | | 705/17 |
| 2012/0018506 A1* | 1/2012 | Hammad | ............. | G06Q 20/385 |
| | | | | 235/375 |
| 2012/0130832 A1 | 5/2012 | Bellamy, III et al. | | |
| 2012/0130853 A1* | 5/2012 | Petri | .................. | G06Q 30/0609 |
| | | | | 705/26.35 |
| 2013/0111546 A1 | 5/2013 | Gargiulo et al. | | |
| 2013/0117185 A1* | 5/2013 | Collison | ............ | G06Q 20/385 |
| | | | | 705/67 |
| 2013/0212666 A1* | 8/2013 | Mattsson | ............. | G06Q 20/385 |
| | | | | 726/9 |
| 2013/0332343 A1* | 12/2013 | Desai | .................. | G06Q 20/322 |
| | | | | 705/39 |
| 2014/0143075 A1* | 5/2014 | Eason, Jr. | ............ | G06Q 20/322 |
| | | | | 705/17 |
| 2014/0201076 A1* | 7/2014 | Pacher | ................ | G06Q 20/405 |
| | | | | 705/44 |
| 2014/0278892 A1* | 9/2014 | Collart | ................... | G06Q 20/36 |
| | | | | 705/14.27 |
| 2015/0127547 A1 | 5/2015 | Powell et al. | | |
| 2015/0154597 A1* | 6/2015 | Bacastow | ............. | G06Q 20/26 |
| | | | | 705/72 |
| 2016/0162873 A1 | 6/2016 | Zhou et al. | | |
| 2016/0239824 A1* | 8/2016 | Klingen | ............... | G06Q 20/385 |
| 2017/0068953 A1* | 3/2017 | Kim | ................... | G06Q 20/3278 |
| 2017/0193606 A1* | 7/2017 | Thomas | ............... | G06Q 20/342 |
| 2017/0221054 A1* | 8/2017 | Flurscheim | ........ | G06Q 20/3276 |
| 2019/0050831 A1 | 2/2019 | Kikinis | | |
| 2019/0164151 A1 | 5/2019 | Doney et al. | | |
| 2021/0142408 A1* | 5/2021 | Compston | ............ | G06Q 20/381 |
| 2021/0365918 A1* | 11/2021 | Showalter | ............. | G06Q 30/06 |
| 2022/0156731 A1* | 5/2022 | Sheth | ................... | G06Q 20/36 |
| 2022/0198504 A1* | 6/2022 | Logan | ............... | G06Q 30/0226 |

OTHER PUBLICATIONS

Dominic Duggan, "Middleware," in Enterprise Software Architecture and Design: Entities, Services, and Resources , IEEE, 2012, pp. 7-58, doi: 10.1002/9781118180518.ch2. (Year: 2012).*

Machine translation of Application KR101708697B1, 2016, retrieved from https://worldwide.espacenet.com/patent/search/family/058313898/publication/KR101708697B1?q=pn%3DKR101708697B1 (Year: 2016).*

International Search Report and Written Opinion for International Application No. PCT/US24/25479; International Filing Date Apr. 19, 2024; Report Mail Date Sep. 11, 2024 (12 Pages).

\* cited by examiner

INTEGRATED GLOBAL TOKENIZATION SYSTEM

CROSS REFERENCE TO RELATED APPLICATIONS

This application claims the benefit of U.S. Provisional Patent Application No. 63/461,073, filed Apr. 21, 2023, the contents of which are incorporated by reference in their entirety herein.

BACKGROUND

In the secure payment industry, there are two primary types of channel categories. The first is considered customer/card present, which is physically being on property or the store. The second is considered customer/card not present, which is facilitated with hosted online ecommerce (ecom) or mobile application systems. These systems, commonly referred to as point-of-sale (POS), not only facilitate items, prices, inventory, and creating an order with items the customer is purchasing, must also support executing and recording payments for each of those orders. Many POS systems must also store a credit card account and account information for future purchases made by the customer or the merchant themselves. In store customers, due to various international network credit card scheme mandates, must present their credit card to be read by a point-of-interaction (POI) device that is manufactured and certified to read credit cards through near-field communication (NFC), inserted into the POI device and communicating with a microchip, swiped on the POI device through a magstripe reader, or manually entered using the numerical buttons on the POI device. The POI device securely encrypts the credit card information. The POI device can also be configured to prompt and securely obtain and encrypt the customer personal identification number (PIN), and provide this information to a software application that formulates a message and communicates that message to a hosted payment platform, also known as a gateway, or directly to a merchant's acquiring bank, to orchestrate a payment to the merchant from the customer's credit card account. Some providers supply the merchant with a Payment Card Industry (PCI) validated point to point encrypted (P2PE) solution, which involves a secure and certified POI device, that uses a complex encryption method, to encrypt primary account number (PAN; e.g., credit card number) information, which can only be decrypted by a certified and secure hardware security module (HSM) within a PCI validated hosted environment. The payload is encrypted from the point of read the card, over the network, to the point of the hosted platform to orchestrate payments securely.

Payments are orchestrated differently with ecom and mobile systems. The customer enters their credit card manually into the ecom or mobile application, or initiates a selection using their digital wallet of their credit card previously stored, and the ecom or mobile system formulates a message and transmits it to a hosted payment platform or acquirer.

SUMMARY

According to an aspect, an integrated selling system platform with integrated global tokenization orchestration middleware includes a workstation including one or more processors and a memory system including a plurality of instructions executable by the one or more processors to provide a point-of-sale (POS) application and a middleware. Source code of the middleware can be configured to be compiled and run on a variety of workstation operation systems. The middleware can include multiple communication interfaces, each of the multiple communication interfaces corresponding to one of multiple communication protocols, and the middleware is POS and point-of-interaction (POI) device agnostic. The workstation can be configured to interface with a hosted platform used to perform both payments and global tokenization services inside, or outside, of a restricted jurisdiction for primary account number (PAN) export and storage, and a hosted network token provisioning system. The middleware can be configured to receive a request from the POS application to obtain a global token from the hosted platform, receive a request via one of the communication protocols to obtain the global token through a POI device that reads and encrypts credit card data, and receive and forward the request to obtain the global token to an in-region hosted system to decrypt the encrypted credit card data using a hardware security module that provisions an international credit card scheme network token. The middleware can also be configured to receive the international credit card scheme network token via one of the communication protocols, execute a request to the hosted platform to provision a merchant-specific global token using the international credit card scheme network token, and receive the merchant-specific global token and return the merchant-specific global token back to the POS application for storage and future usage to orchestrate a future payment authorization transaction via the merchant-specific global token.

According to another aspect, a computer-implemented method, within a middleware of an integrated selling system platform, to provide a credit card account number linked with a user account can include transmitting a plurality of instructions to a hosted platform used for merchant specific global token provisioning, when requesting a token, to identify a user account number linked to the credit card account number obtained from a point-of-interaction (POI) device, using a network token, and subsequently communicate to a platform with a user account and payment information. The computer-implemented method can also include interrogating the user account and payment information to determine whether the user account is eligible for accruing units and/or eligible to redeem units based on information returned to the hosted platform, receiving information on a plurality of options for accrual and/or redemption from the hosted platform, and presenting to a customer associated with the credit card account number one or more of the options.

According to an aspect, a computer program product includes a storage medium embodied with computer program instructions that when executed by one or more processors cause the one or more processors to implement receiving a request from a point-of-sale (POS) application to obtain a global token from a hosted platform, receiving a request via a communication protocol of multiple communication protocols supported by a middleware to obtain the global token through a point-of-interaction (POI) device that reads and encrypts credit card data, and receiving and forwarding the request to obtain the global token to an in-region hosted system to decrypt the encrypted credit card data using a hardware security module that provisions an international credit card scheme network token. The computer program instructions that when executed by the one or more processors can also cause the one or more processors to implement receiving the international credit card scheme network token via one of the communication protocols, executing a request to the hosted platform to provision a merchant-specific global token using the international credit card scheme network token, receiving the merchant-specific global token, and returning the merchant-specific global token back to the POS application for storage and future usage to orchestrate a future payment authorization transaction via the merchant-specific global token.

The above features and advantages, and other features and advantages, of the disclosure are readily apparent from the following detailed description when taken in connection with the accompanying drawings.

BRIEF DESCRIPTION OF THE SEVERAL VIEWS OF THE DRAWINGS

The subject matter is particularly pointed out and distinctly claimed in the claims section at the conclusion of the specification. The forgoing and other features, and advantages of the embodiments herein are apparent from the following detailed description taken in conjunction with the accompanying drawings in which:

Figure 1:
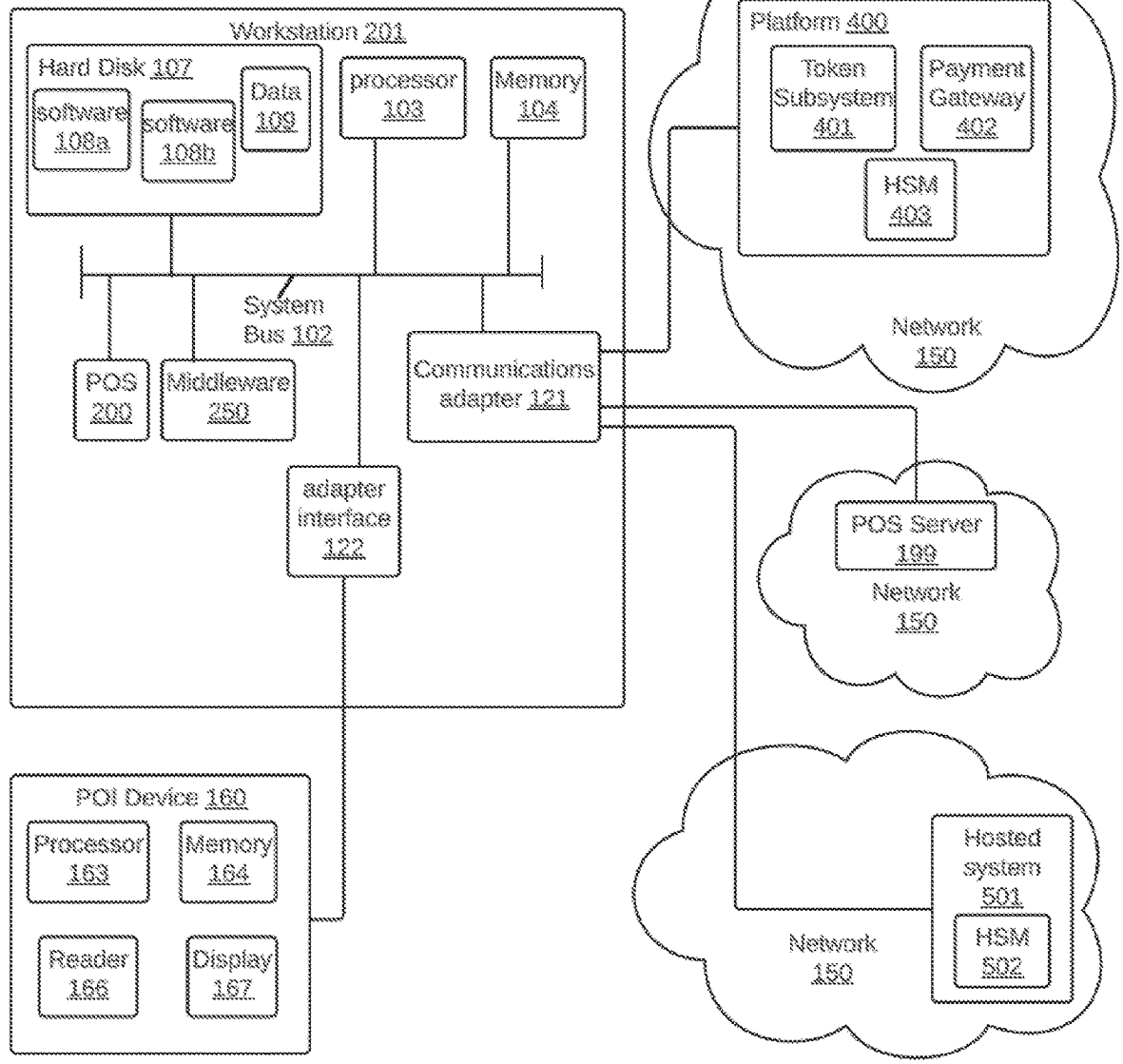
FIG. 1 depicts a system in accordance with one or more embodiments.

The diagrams depicted herein are illustrative. There can be many variations to the diagrams and/or the operations described herein without departing from the spirit of the described aspects. For instance, the actions can be performed in a differing order, or actions can be added, deleted, or modified. Also, the term "coupled" and variations thereof describe having a communications path between two elements and do not imply a direct connection between the elements with no intervening elements/connections between them. All of these variations are considered a part of the specification.

DETAILED DESCRIPTION

This disclosure relates to a fully integrated omnichannel commerce platform comprising of multiple computer systems and software that, in combination, provides a POS agnostic, payment device agnostic, payment acquirer agnostic global token solution within payment orchestration and to facilitate removal of merchant's systems from PCI scope with both customer present and customer not present payments, while also abiding by various global jurisdiction PAN handling laws and policies for transmitting and storage of such data. The payment operation is a mechanism for enabling different (e.g. independent and separate) systems that generally do not communicate or interact to be fully compatible and integrated without extensive on-board programming. Embodiments disclosed herein may include a system, apparatus, method, and/or computer program product for implementing the POS, POI device, and platform integration (which herein may be referred to as Integrated Selling System).

In order to store a credit card in the POS, the merchant has two choices, to store the PAN itself or to store a token that represents that PAN. In order to stay in a reduced PCI security scope, a specific PCI validated index token must be used. Obtaining a token requires an additional step and technical integration from the POS with the hosted payment platform, acquirer, or a separate certified token provider. Credit card issuing banks have partnered with many international card schemes to create and issue merchant specific network tokens. While these tokens reduce PCI scope, they are formatted the same way a PAN is, and due to POS constraints preventing the storage of a PAN, a network token will not be able to be stored in the system as it won't pass the system checks and constraints, preventing either a PAN or a network token from being stored. Therefore, a merchant specific global index token may be used, with the network token and/or PAN linked to that for payment orchestration. Network tokens can be used to facilitate payments, in the same way a PAN can be used, globally. In many countries, there are regional jurisdictions which have laws and regulations governing the transmission and storage of PAN data. In some jurisdictions the PAN cannot be transmitted outside of that jurisdiction for any reason, including executing a payment or storing the PAN on file for future use. In some regulations, even if the PAN was entered through an ecom POS by the customer themselves, the system is not permitted to store the PAN on file for future use. Globally, new legislation and regulations are changing and being passed to further constrain the usage and storage of PAN information to prevent fraud and misuse of the customer's credit card account. This limits the ability, and substantially increases the complexity, to store the PAN and create a token to be stored in the POS systems for future use whereby the POS, using that token to orchestrate a payment is equally constrained.

Various types of user accounts can establish links between a PAN and user account to support purchasing and other types of transactions. As an example, many loyalty providers work with merchants to link the PAN to the specific customer's loyalty account, and when orchestrating a payment, may also provide the customer with the ability to earn or redeem loyalty units during that purchase experience. Issuing banks provide a primary account reference (PAR) that is linked to the PAN, and any device tokens obtained from digital wallets (DPAN) or network tokens the customer may have. This PAR value is typically obtained when provisioning a network token. Using PAR is a common way to identify that any token that is on file or used in a payment, has the same PAR value (linked to the same PAN) and can then be linked to the loyalty account. However, using a PAR value, with tokens, to also identify a loyalty account adds more complex data storage, system integrations, and communication.

A POS system therefore can orchestrate multiple specific integrations and communications to provision a network token, securely transport that outside of the restricted jurisdiction for exchange with a PCI validated globally unique merchant tokens, and save that for future use in the POS. In addition, there is increased complexity to also store PAR values, linked to loyalty accounts, also linked to the network tokens, and the merchant-specific global token, in order to add integrated and seamless loyalty offerings through the POS.

There are tens of thousands of POS systems, hundreds of POI device manufacturers, thousands of hosted payment platforms or acquirers, and thousands of loyalty providers (and/or other types of user account support systems). To orchestrate payments, and/or loyalty offerings, and securely tokenize, requires a technical software integration between all the systems and the POI devices. This presents a substantial challenge and limitation for each of the merchants, the providers of the POS, hosted payment platforms, acquirers, and loyalty providers. The software enhancements required to integrate the systems together is substantial, even just for one end to end system (POS to device to network token provisioner to payment platform to loyalty provider). An agnostic software middleware, "Integrated Global Tokenization Middleware and Platform" is further described herein that orchestrates a seamless technical and functional integration across multiple interfaces with multiple protocols to multiple POS, ecom/mobile POS, POI devices, loyalty providers, network token provisioners, and hosted payment platforms. This agnostic middleware, coupled with hosted services, can be integrated to by the POS, to seamlessly orchestrate global tokenization and linked loyalty, across many providers. Such a solution can include integrations to multiple in jurisdiction network token providers to orchestrate global tokenization whereby the PAN remains in that jurisdiction and a national card scheme network token can be transmitted outside of the jurisdiction and stored, in return for a merchant specific globally unique PCI validated index token, which can be stored in the POS.

An agnostic middleware solution, with multiple interfaces and protocols, is integrated to one of any POS systems to facilitate an agnostic and seamless integration to one of multiple POI devices supporting multiple protocols and card reading capabilities, one of multiple network token service providers supporting multiple protocols, one of multiple acquirers and/or payment service providers supporting multiple protocols, to provide the merchant-specific global tokenization for payment orchestration, including PCI validated point to point encryption (P2PE) solution with the POI integration. The middleware solution with the integrated hosted platform services, can be hosted and located inside of a restricted data governance jurisdiction ("restricted jurisdiction") ensuring the PAN is not transmitted or stored externally outside of the restricted jurisdiction, ensuring the merchant abides by laws and regulations for PAN usage and storage. The advantage of this solution can enable any POS to integrate only to the middleware, within one of the multiple interfaces, using one of the multiple protocols, which generalizes the POS from multiple POI devices, multiple hosted payment platforms and acquiring providers, and multiple network token service providers to obtain a global token for payment execution in any region globally. The same middleware solution can support multiple credit card entry mechanisms, including manual entry by a user and digital wallet integration and communication. The same middleware can also support a non-integrated POS orchestration, whereby a user (e.g., a POS operator) can securely obtain a global token with a user interface provided with the middleware, enabling the user to receive that token, then manually enter it into the POS system. In all cases, the same middleware can be used to securely execute a detokenization request to obtain the underlying network token for payment orchestration as an integrated component of one or more of POS/ecom/mobile, POI devices, network service providers, and hosted payment platform/acquirers.

The additional orchestration of leveraging PAR values in real time within the orchestration of payments and tokenization to seamlessly enable user account functions can increase utility for the consumer and the merchant. Additionally, with the hosted platform and middleware, leveraging one of multiple integrations to systems can provide real-time earning or redeeming of units, linked to the original underlying PAN used for payment from the POS.

The constraints and burden for merchants and their selling systems around complexity, quantity of integrations, proper security, data governance and regulation adherence, timeliness of enablement, and overall technical challenges can be greatly reduced or eliminated according to aspects as described herein.

Turning now to FIG. 1, an integrated selling system (System 100) for implementing the teachings herein is shown according to one or more embodiments. The system 100, in general, implements and manages payment for items, food, and/or service whether a card is present for payment or manually entered.

The system 100 has a workstation 201. The workstation 201 can be an electronic, computer framework including and/or employing any number and combination of computing devices and networks utilizing various communication technologies, as described herein. The workstation 201 can be scalable, extensible, and modular, with the ability to change to different services or reconfigure some features independently of others. Examples of the workstation 201 include, but are not limited to, a desktop computer, a laptop computer, a dedicated property management computer terminal, a point of sale computer, a tablet, a smart phone, and/or a computer acting as a server, hosted in a data center or within the store. The workstation 201 includes a system bus 102 coupling a processor 103 to a memory 104 and various other components.

The processor 103 includes any processing hardware, software, or combination of hardware and software utilized by the workstation 201 that carries out the computer readable program instructions by performing arithmetical, logical, and/or input/output operations. For instance, the processor 103, also referred to as a processing circuit, microprocessor, or computing unit, can include one or more central processing units. Examples of the processor 103 include, but are not limited to, an arithmetic logic unit, which performs arithmetic and logical operations; a control unit, which extracts, decodes, and executes instructions from a memory; and an array unit, which utilizes multiple parallel computing elements.

The memory 104 is an example of a tangible device (e.g., a computer-readable storage medium) that retains and stores computer readable program instructions (such as a computer program product) for use by the processor 103 to carry out the operations of embodiments herein. The computer readable storage medium may be, for example, but is not limited to, an electronic storage device, a magnetic storage device, an optical storage device, an electromagnetic storage device, a semiconductor storage device, or any suitable combination of thereof. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The memory 104 can also include a variety of computer system readable media. Such media may be any available media that is accessible, and such media includes both volatile and non-volatile media, removable and non-removable media. As shown in FIG. 1, the memory 104 includes read only memory (ROM) and random access memory (RAM). The memory is coupled to the system bus 102 and may include a basic input/output system (BIOS), which controls certain basic functions of the system 100. The RAM is read-write memory coupled to the system bus 102 for use by the processor 103. The workstation 201 also includes a hard disk 107, which is another example of a tangible device (e.g., a computer readable storage medium) that retains and stores computer readable program instructions executable by the processor 103. A non-exhaustive list of more specific examples of the computer readable storage medium (i.e., the memory 104) includes: a portable computer diskette, an erasable programmable read-only memory (EPROM or Flash memory), a static random access memory (SRAM), a portable compact disc read-only memory (CD-ROM), a digital versatile disk (DVD), a memory stick, and any suitable combination of thereof. The hard disk 107 stores software 108a, 108b (which may be generally referred to as software 108). The software 108 is stored as instructions for execution within the system 100 by the processor 103 (which correspondingly performs operations and/or processes along with an operating system, one or more application programs, other program modules, and data 109. The data 109 includes a set of values of qualitative or quantitative variables organized in various data structures to support and be use by operations of the software 108. The software 108 may execute entirely on the workstation 201, partly on the workstation 201, as a stand-alone software package, partly on the workstation 201 and partly on a remote computer or server, or entirely on the remote computer or server. Thus, as configured in FIG. 1, the operations of the software 108 and the data 109 (e.g., which provide the device agnostic payment operation) are necessarily rooted in the computational ability of the processor 103, the workstation 201, and/or components connected thereto to overcome and address the herein-described shortcomings of the conventional multi-device POS or point of purchase systems conventional middleware therein. In this regard, the software 108 and the data 109 replace conventional middleware and improve computational operations of the processor 103, the workstation 201, and/or components connected thereto, thereby reducing errors and compatibility concerns in conventional multi-device POS or point of purchase systems (thereby increasing efficiency of the system 100).

The system 100 of FIG. 1 includes one or more adapters (e.g., hard disk controllers, network adapters, graphics adapters, etc.) that interconnect and support communications between the processor 103, the memory 104, the hard disk 107, and other components of the system 100 (e.g., peripheral and external devices). In one or more embodiments, the one or more adapters can be connected to one or more I/O buses that are connected to the system bus 102 via an intermediate bus bridge, and the one or more I/O buses can utilize common protocols, such as the peripheral component interconnect.

As shown, the workstation 201 includes a communications adapter 121 and an interface adapter 122. The communications adapter 121 interconnects the workstation 201 with a network 150 of the system 100 enabling the workstation to communicate with other systems, devices, data, and software, such as a payment gateway 402 and a POS server 199. The interface adapter 122 interconnects the workstation 201 with a POI device 160. The POI device 160 comprises a processor 163, a memory 164, a reader 166, and a display 167. The processor 163 and the memory 164 can be similar to the processor 103 and the memory 104 described herein. The POI device is a PCI validated device approved within a PCI validated P2PE solution. As such, the POI device securely reads and encrypts the PAN data within secure modules within the device, orchestrated between the reader 166, the processor 163, and the memory 164. The payment gateway 402, token subsystem 401, HSM 403, hosted system 501, the HSM 502, the POS server 199, and/or the POI device 160 (like the workstation 201) can be an electronic, computer framework comprising and/or employing any number and combination of computing devices and networks utilizing various communication technologies, while being scalable, extensible, and modular.

The payment gateway 402, for instance, represents computer systems of a payment service provider and/or bank that authorizes direct debit or credit card payment processing for businesses, retailers, vendors, service providers, etc. (whether on-line or in-store). The token subsystem represents computing services that securely stores PAN data within a PCI DSS (Payment Card Industry Data Security Standard) validated and audited environment, computes a PCI validated merchant specific index style globally unique token, and returning that token to the requesting system. The POS server 199 provides external processing power, data storage, networking, and graphical user interfaces to the system 100 for implementing the payment and fulfilling the sale operations for purchasing items, services, etc. The POI device 160 can be any payment terminal that reads and encrypts credit card information. The token subsystem 401 represents computing services within the platform 400 to securely store PAN and Network Token data, then compute and return merchant specific global tokens. The hosted system 501 with the HSM 502 represent computing services within the system that securely decrypts encrypted PAN and PIN data, stores a PAN, and provisions international credit card scheme merchant specific network token and returns that token to the requesting system. The hosted system 501 also provides additional services specific to network tokenization including but not limited to returning a payment account reference (PAR), exchanging device tokens for network tokens, exchanging merchant-specific global tokens with network tokens, and returning attributes about the network token (the PAN's BIN (Bank Identification Number), type of account (credit, debit), issuing bank information, and card imagery). The hosted system 501 may also be located within restricted data governance jurisdictions where PAN data is prohibited from being transmitted over the network to locations outside of the jurisdiction and stored outside of the jurisdiction. Note that the payment gateway 402, the POS server 199, the POI device 160, the token subsystem 401, and the hosted system 501 are different (e.g., independent and separate) systems that generally do not communicate or interact without the conventional middleware, which has inherent technical compatibility and integration problems that require extensive on-board programming to integrate all the systems and subsystems to facilitate payment operations, tokenization, and PAN linked loyalty. More particularly, each of the payment gateway 402, the POS server 199, the POI device 160, the token subsystem 401, and the hosted system 501 can require a distinct communication protocol that is incompatible with a communication protocol of the other sub-systems. In turn, the technical effect and benefits of the middleware 250 include providing the device agnostic payment operation to improve computational operations of the processor 103, the workstation 201, the payment gateway 402, the POS server 199, the token subsystem 401, the hosted system 501, the POI device 160, thereby eliminating concerns and added complexity of the software 108 and POS software 200, and POS server 199.

In accordance with one or more embodiments, the workstation 201 may be connected to the payment gateway 402, token subsystem 401, hosted system 501, and the POS server 199 through any type of network 150, including a local area network (LAN) or a wide area network (WAN), internet, virtual private network, or the connection may be made to an external computer (for example, through the Internet using an Internet Service Provider). In one or more embodiments, the internal operations of the software 108 and the data 109 can be implemented on the network 150 to provide a platform as a service, a software as a service, and/or infrastructure as a service. The middleware 250 is the unique software that integrates the separate systems together to orchestrate the tokenization and linked loyalty. The reader 166 can be, for example, a device that interfaces with a payment card to read the credit card PAN and data to facilitate electronic funds transfers from that credit card account (e.g., via tap (near field communication), insert, swipe, or manually card information entry actions) to the merchant's account. The display 167 can include any visual device for providing a user interface and may include, for example, a graphics controller to provide graphics performance (such as a display and management of a graphic user interface).

Figure 2:
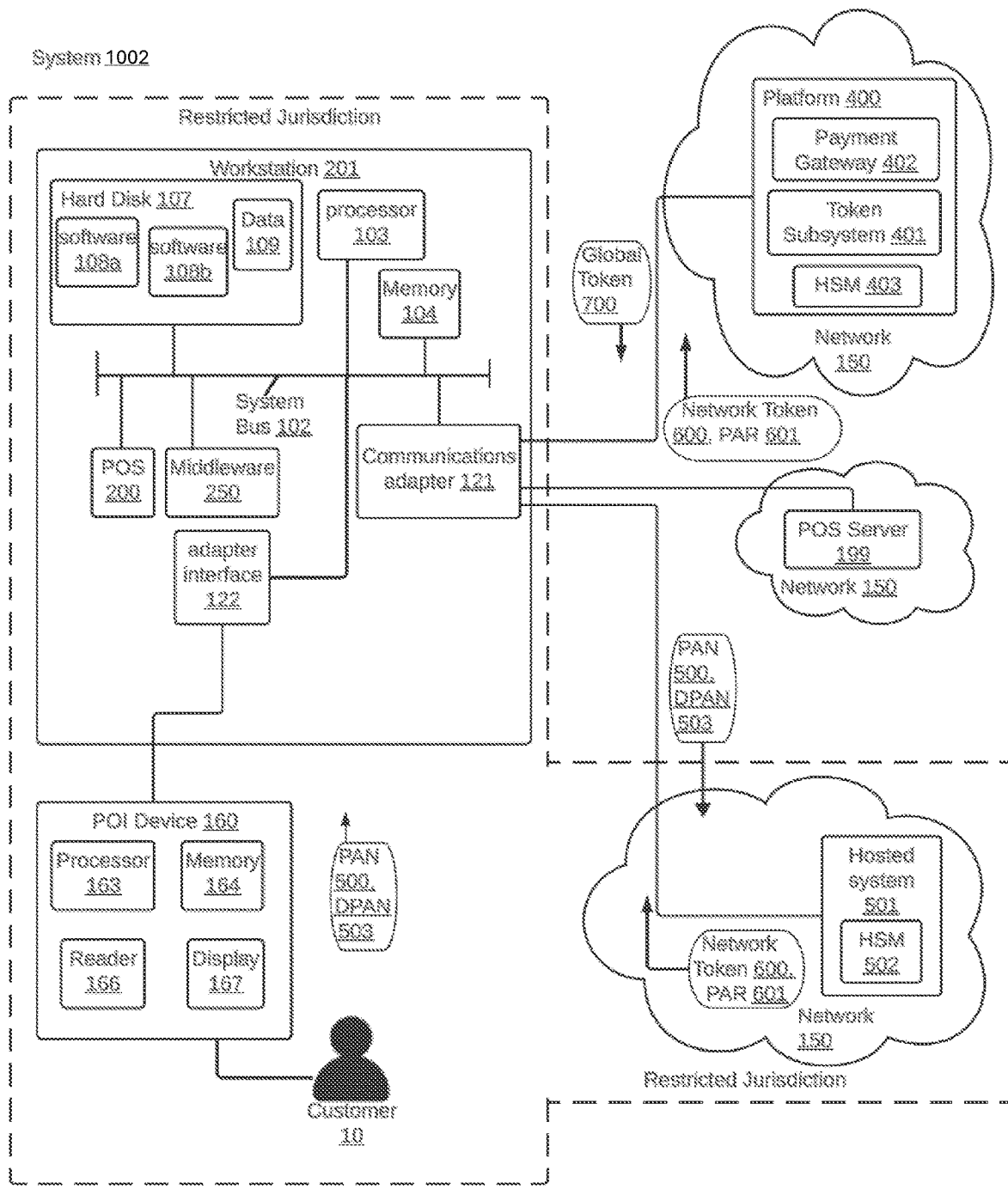
FIG. 2 depicts a process flow of an in-store POS system integrated to the middleware within a restricted jurisdiction in accordance with one or more embodiments.

Turning now to FIG. 2, a system 1002 is depicted for implementing card present payment and tokenization process, fully integrated between the POS 200, Middleware 250, POI device 160, hosted system 501, and platform 400, securely transmitting the PAN 500 or DPAN 503, when that credit card is read and encrypted, leveraging Point to Point Encryption, from the point of entry to a secure HSM 502, within a restricted jurisdiction in exchange for a network token 600, and PAR 601, that can then be used to exchange for a merchant's global token 700, with platform 400, whereby the network token is exported out of jurisdiction and stored in platform 400, instead of the PAN, noting that platform 400 is outside of a restricted jurisdiction. The system 1002 is an example configuration of the system 100 of FIG. 1.

The system 1002 has a workstation 201. In the example of FIG. 2, the POS 200 software resides and is running on the workstation 201 performing POS functions. The POS 200 software communicates to the middleware 250 to execute a fully integrated end to end process whereby the POI device 160, hosted system 501, and platform 400 is integrated together to execute global tokenization, and return the results back to the POS 200 software. The POS 200 software sends a message to the middleware 250 to in turn communicate to the POI device 160 to be ready to accept a credit card read. The customer 10 inserts, taps, or manually enters their credit card, or taps their phone with the digital wallet, for token provisioning. The POI device 160 securely obtains the PAN 500 or DPAN 503, encrypts the PAN 500 or DPAN 503, and provides the encrypted data to the middleware 250. The middleware 250 forms a specific message and communicates to the in jurisdiction hosted system 501. The hosted system 501 securely decrypts the PAN 500 or the DPAN 503 using a hardware security module HSM 502. The hosted system 501 then provisions a network token and returns that token 600, and the PAR 601, and additional information back to the middleware 250. Next, the middleware 250 forms a specific message and communicates to the platform 400 to obtain the merchant's global token. The platform 400 leverages the token subsystem 401 to securely store the network token 600, and PAR 601, and loyalty account if provided by the POS, and provisions a merchant-specific global token 700. The global token subsystem 401 returns the global token 700 to the middleware 250. The middleware 250 in turn returns the global token 700 to the POS 200 software for storage and future usage. The hosted system 501 and HSM 502 will be located inside of a restricted jurisdiction in cases where the merchant's location is inside of that restricted jurisdiction, ensuring the PAN 500 or DPAN 503 isn't transported outside of that jurisdiction over the network. Under the regulations, the merchant specific network token 600, and PAR 601, can be transported and stored outside of the restricted jurisdiction in Platform 400 for producing the merchant's global token 700.

Figure 3:
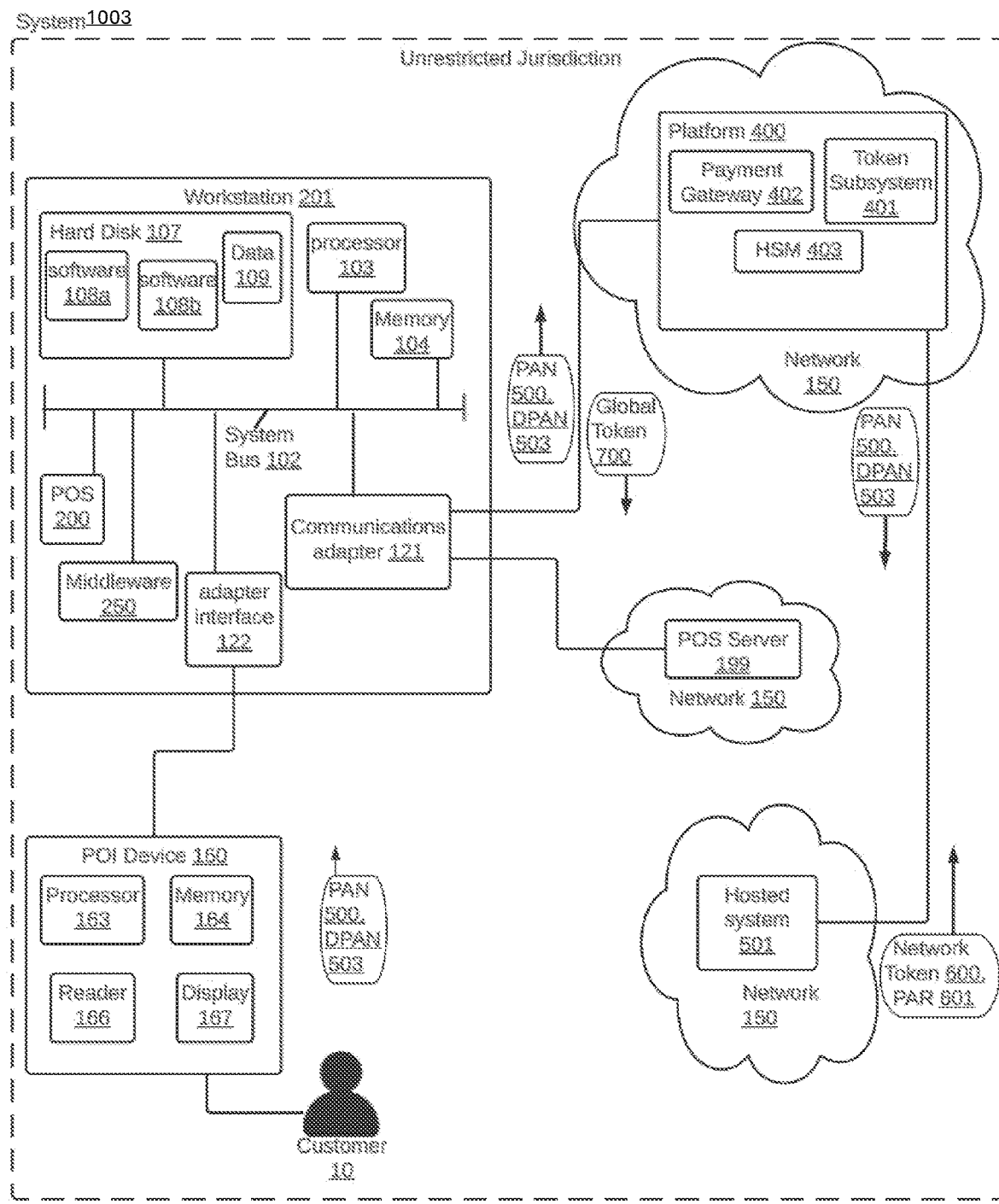
FIG. 3 depicts a process flow of an in-store POS system integrated to the middleware as a PCI Validated P2PE solution in accordance with one or more embodiments.

Turning now to FIG. 3, a system 1003 is depicted for implementing card present payment and tokenization process, fully integrated between the POS 200, POI device 160, hosted Middleware 250, Hosted System 501, and Platform 400, securely transmitting the PAN 500 or DPAN 503, when that credit card is read and encrypted, leveraging Point to Point Encryption, from the point of entry to a secure HSM 403, outside of a restricted jurisdiction in exchange for a network token 600, and PAR 601, that can then be used to exchange for a merchant's global token 700, with Platform 400, whereby the network token is stored instead of the PAN. The system 1003 is an example configuration of the system 100 of FIG. 1.

The system 1003 has a workstation 201. The POS 200 software resides and is running on the workstation 201 performing POS functions. The POS 200 software communicates to the middleware 250 to execute a fully integrated end to end process whereby the POI device 160, hosted system 501, and platform 400 is integrated together to execute global tokenization, and return the global token 700 back to the POS 200 software. The POS 200 software sends a message to the middleware 250 to in turn communicate to the POI device 160 to be ready to accept a credit card read. The customer 10 inserts, taps, or manually enters their credit card, or taps their phone with the digital wallet, for token provisioning. The POI device 160 securely obtains the PAN 500 or DPAN 503, encrypts the PAN 500 or DPAN 503, and provides the encrypted data to the middleware 250. The middleware 250 forms a specific message and communicates to the platform 400 with the encrypted data, and instructions to provision a network token. Platform 400 securely decrypts the PAN 500 or the DPAN 503 using the HSM 403, communicates the PAN 500 or DPAN 503 to the Hosted System 501. The hosted system 501 then provisions a network token and returns that merchant-specific network token 600, and the PAR 601, and additional information back to the platform 400. Next, platform 400 leverages the token subsystem 401 to securely store the network token 600, and PAR 601, and loyalty account if provided by the POS, and provisions a merchant-specific global token 700. The global token subsystem 401 returns the global token 700 to the platform 400, which in turn returns the global token 700 to the middleware 250. The middleware 250 in turn returns the global token 700 to the POS 200 software for storage and future usage. The platform 400 and hosted system 501 will be located outside of a restricted jurisdiction.

Figure 4:
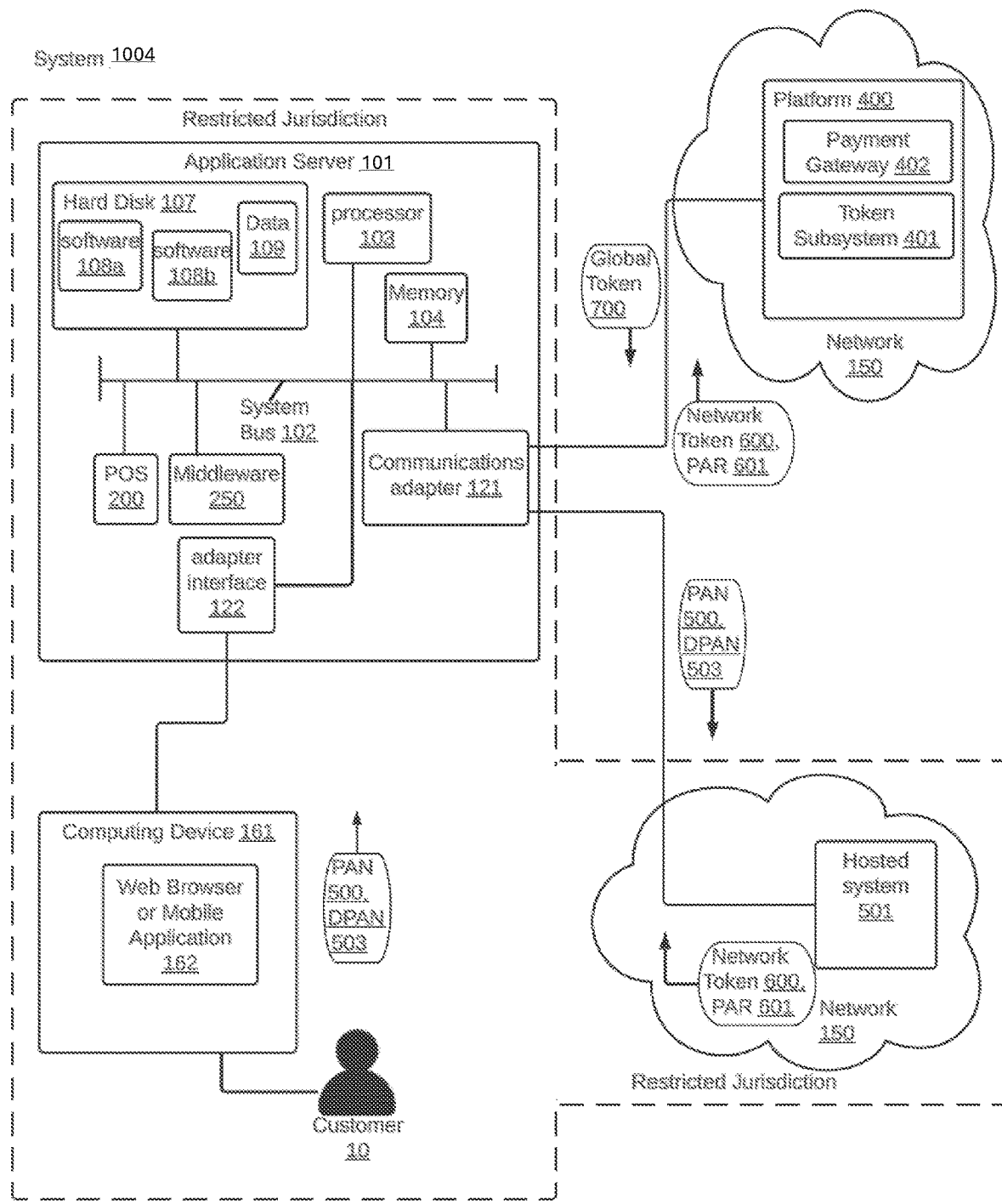
FIG. 4 depicts a process flow of an on-line POS system (ecom or mobile) integrated to the middleware within a restricted jurisdiction in accordance with one or more embodiments.

Turning now to FIG. 4, a system 1004 is depicted for implementing on-line card not present processing for ecom and mobile applications, fully integrated between the POS 200, middleware 250, a customer's computing device 161 (similar to workstation 201 described herein), the web browser software or mobile application software 162, hosted system 501, and platform 400, securely transmitting the PAN 500 or DPAN 503, inside of a restricted jurisdiction in exchange for a network token 600, and PAR 601, that can then be used to exchange for a merchant's global token 700, with platform 400. The system 1004 is an example configuration of the system 100 of FIG. 1.

The system 1004 has an application server 101. For brevity, the application server 101 is similar to workstation 201, defined herein, as a hosted computing system. The POS 200 software resides and is running on the application server 101 performing POS functions. The POS 200 software may be a web application that interacts with a web browser on the computing device 161, or may be the server side application communicating with the mobile application 162 on the computing device 161, to interface with the Customer 10. The customer 10 enters their PAN 500, or selects the credit card from the digital wallet producing a DPAN 503, which is communicated by the web browser or mobile application 162 back to the POS 200 running on application server 101. The POS 200, communicates the PAN 500 or DPAN 503, and optionally a loyalty account number, to the middleware 250 also running on the application service 101, which forms a specific message and communicates to the in jurisdiction hosted system 501. The hosted system 501 then provisions a network token and returns that token 600, and the PAR 601, and additional information back to the middleware 250. Next, the middleware 250 forms a specific message and communicates to the platform 400 to obtain the merchant's global token. The platform 400 leverages the token subsystem 401 to securely store the network token 600, and PAR 601, and loyalty account if provided by the POS, and provisions a merchant-specific global token 700. The global token subsystem 401 returns the global token 700 to the middleware 250. The middleware 250 in turn returns the global token 700 to the POS 200 software for storage and future usage. The hosted system 501 will be located inside of a restricted jurisdiction in cases where the merchant's location is inside of that restricted jurisdiction, ensuring the PAN 500 or DPAN 503 isn't transported outside of that jurisdiction over the network. The network token 600, and PAR 601, can be transported and stored outside of the restricted jurisdiction in platform 400 for producing the merchant's global token 700 ensuring the merchant is abiding by data governance regulations and laws.

Figure 5:
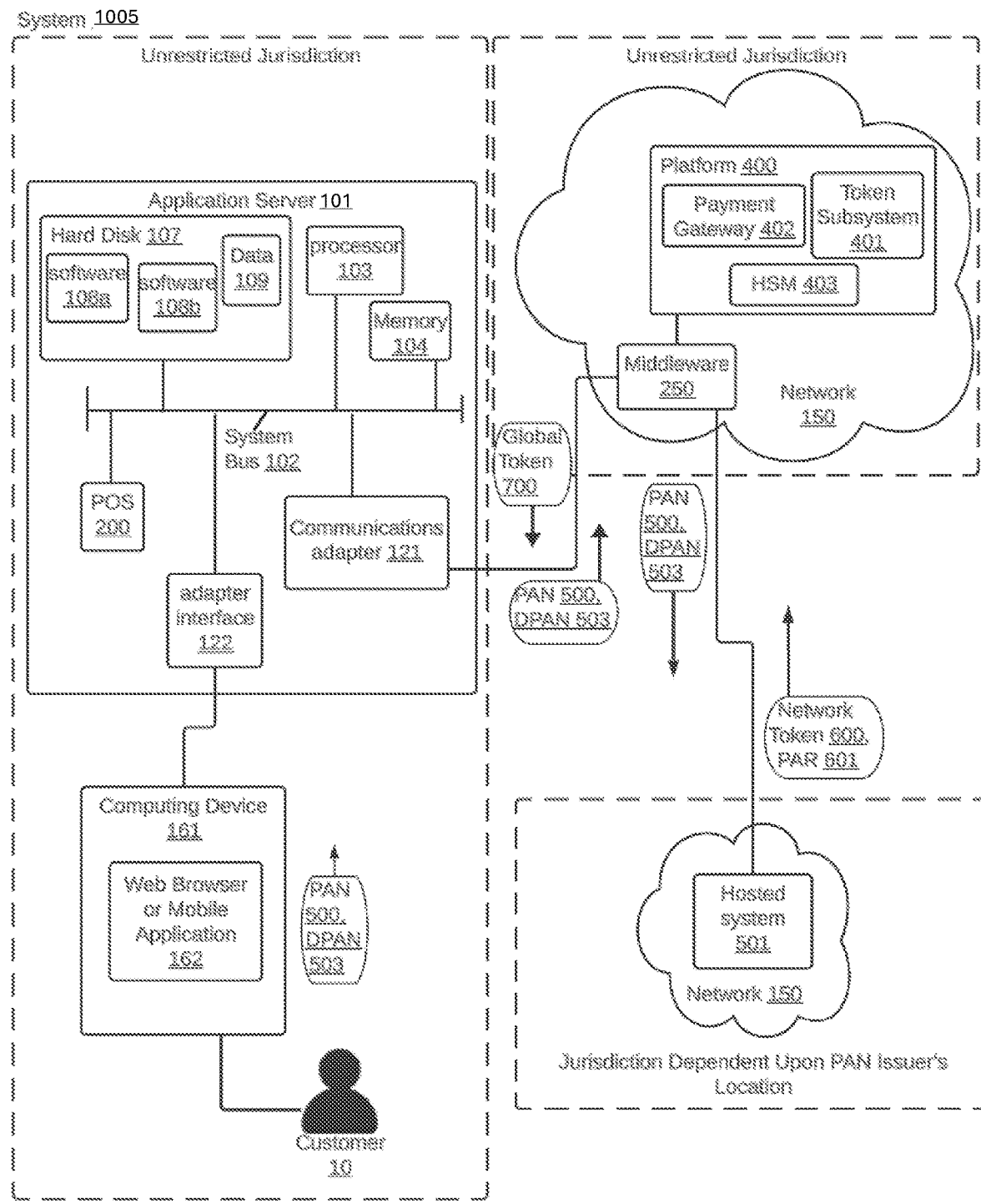
FIG. 5 depicts a process flow of an on-line POS system (ecom or mobile) integrated to the middleware outside of a restricted jurisdiction in accordance with one or more embodiments.

Turning now to FIG. 5, a system 1005 is depicted for implementing on-line card not present processing for ecom and mobile applications, fully integrated between the POS 200, middleware 250, a customer's computing device 161, the web browser or mobile application 162, hosted system 501, and platform 400, securely transmitting the PAN 500 or DPAN 503, outside of a restricted jurisdiction in exchange for a network token 600, and PAR 601, that can then be used to exchange for a merchant's global token 700, with platform 400. In cases where the PAN is issued by a credit card issuer inside of a restricted jurisdiction, the middleware 250 will communicate with a hosted system 501 in that jurisdiction. The system 1005 is an example configuration of the system 100 of FIG. 1.

The system 1005 has an application server 101. The POS 200 software resides and is running on the application server 101 performing POS functions. The POS 200 software may be a web application that interacts with a web browser on the Computing Device 161, or may be the server side application communicating with the mobile application 162 on the computing device 161, to interface with the customer 10. The customer 10 enters their PAN 500, or selects the credit card from the digital wallet producing a DPAN 503, which is communicated by the web browser or mobile application 162 back to the POS 200 running on application server 101. The POS 200, communicates the PAN 500 or DPAN 503, and optionally the loyalty account, to the middleware 250, in this case, hosted outside of the application server, which forms a specific message and communicates to the hosted system 501. The hosted system 501 then provisions a network token and returns that token 600, and the PAR 601, and additional information back to the middleware 250. Next, the middleware 250 forms a specific message and communicates to platform 400 to obtain the merchant's global token, sending the network token 600, PAR 601, and the loyalty account if it was provided by the POS 200. Platform 400 leverages the token subsystem 401 to securely store the network token 600, and PAR 601, and loyalty account if provided by the POS, then provisions a merchant-specific global token 700, returning that to the middleware 250, which in turn returns the global token 700 to the POS 200 for storage and future usage. The hosted system 501 may also need to be located inside of a restricted jurisdiction in cases where the PAN is issued by a bank inside of that jurisdiction and regulations prohibit the storage of that PAN outside of the jurisdiction. The middleware 250 is configured to communicate with multiple hosted system 501 in multiple regions.

Figure 6:
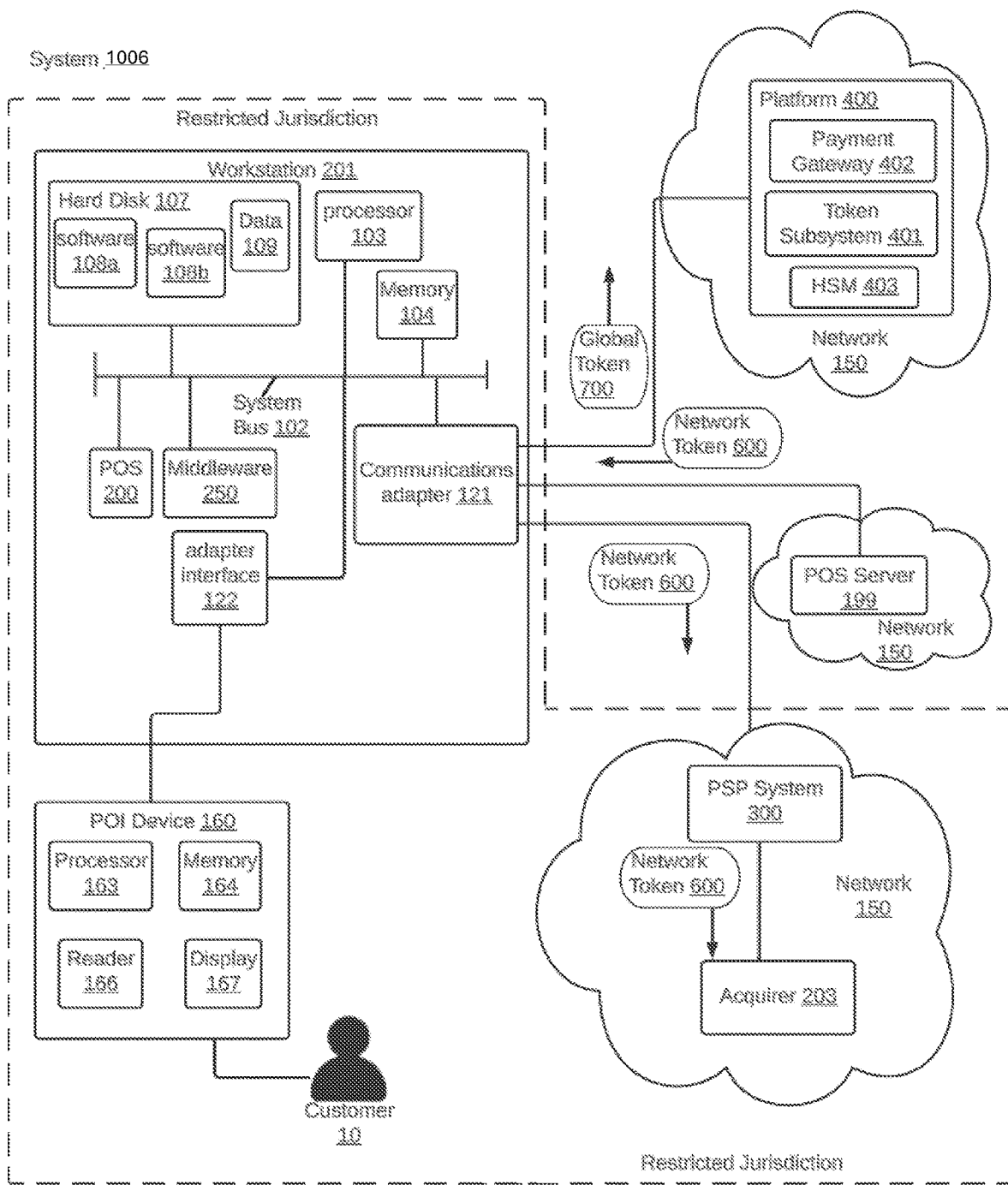
FIG. 6 depicts a process flow of a POS system integrated to the middleware to process a payment with a global token inside of a restricted jurisdiction in accordance with one or more embodiments.

Turning now to FIG. 6, a system 1006 is depicted for implementing payment orchestration within a store inside of a restricted jurisdiction, fully integrated between the POS 200, middleware 250, POS server 199, POI device 160, platform 400, a payment service provider (PSP) system 300 (typically a payment gateway), and acquirer 203, for exchanging a global token 700 for a network token 600 to facilitate a credit card payment. The system 1006 is an example configuration of the system 100 of FIG. 1.

The system 1006 has a workstation 201. The POS 200 software resides and is running on the workstation 201 performing POS functions. The POS 200 software communicates to the middleware 250 to exchange a global token 700, for a network token 600. The middleware 250 formulates a message and communicates to platform 400, sending the global token 700, which in turn communicates to the token subsystem 401, exchanging the global token 700 for a network token 600. Platform 400 then returns the network token 600 to the middleware 250. Depending upon the type of PSP integration, either the middleware 250, or the POS 200 will in turn then formulate a message and communicate the network token 600 to a PSP system 300 to orchestrate a credit card payment. The PSP system 300 formulates a message with the network token 600 and communicates to an acquirer 203 to orchestrate the payment. The result of the payment is returned back through the chain of components to POS 200.

Figure 7:
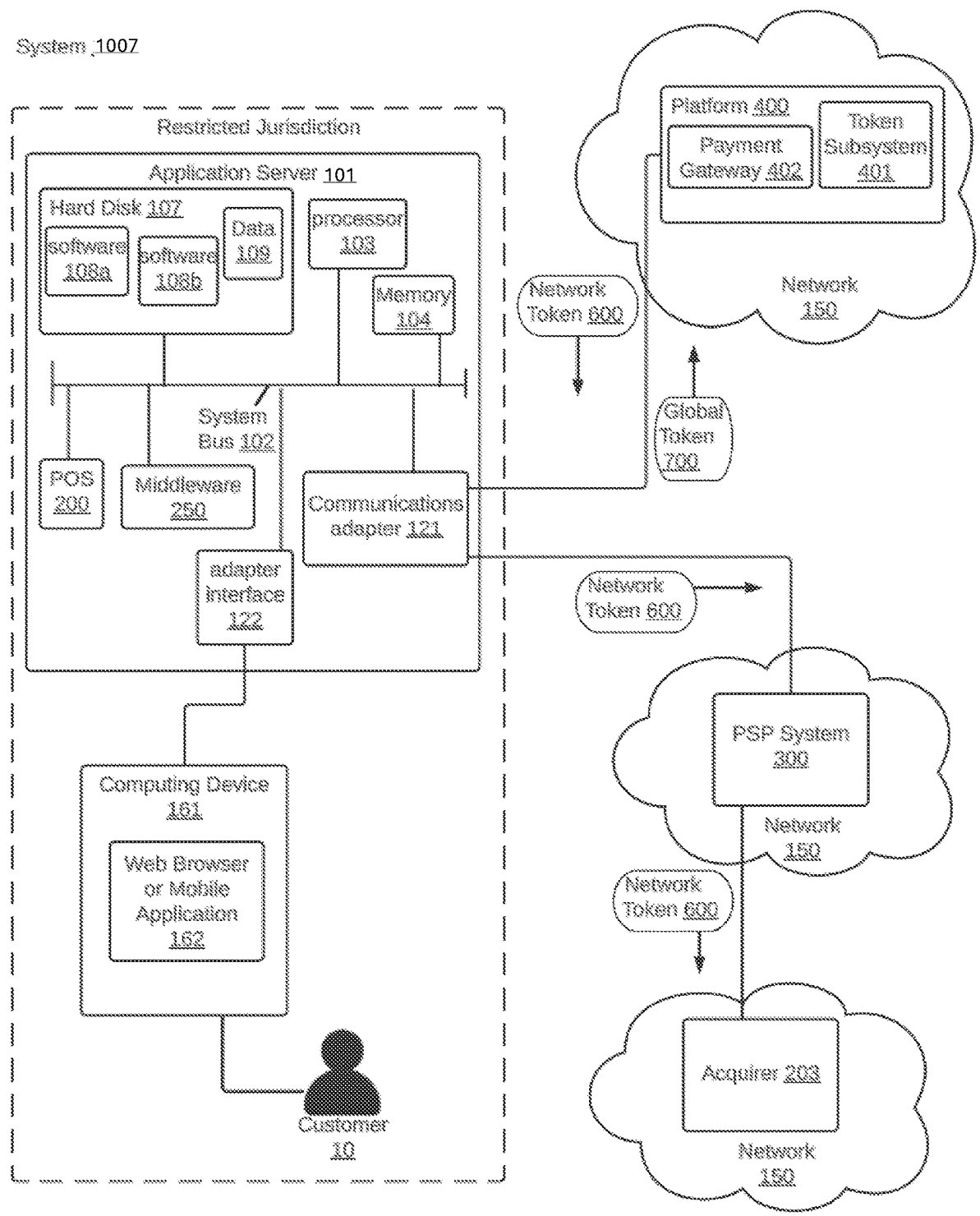
FIG. 7 depicts a process flow of an on-line POS system integrated to the middleware to orchestrate a payment inside of a restricted jurisdiction in accordance with one or more embodiments.

Turning now to FIG. 7, a system 1007 is depicted for implementing on-line card not present processing for ecom and mobile applications, fully integrated between the POS 200, middleware 250, a customer's computing device 161, the web browser or mobile application 162, platform 400, a payment service provider (PSP) system 300, and acquirer 203, for exchanging a global token 700 for a network token 600 to facilitate a credit card payment, from within a restricted jurisdiction. The system 1007 is an example configuration of the system 100 of FIG. 1.

The system 1007 has an application server 101. The POS 200 software resides and is running on the application server 101 performing POS functions. The POS 200 software may be a web application that interacts with a web browser on the computing device 161, or may be the server side application communicating with the mobile application 162 on the computing device 161, to interface with the customer 10. The customer 10 initiates a payment request to the POS 200 application. The POS 200 software communicates to the middleware 250 to exchange a global token 700, for a network token 600. The middleware 250 formulates a message and communicates to platform 400, sending the global token 700, which in turn communicates to the token subsystem 401, exchanging the global token 700 for a network token 600. The platform 400 then returns the network token 600 to the middleware 250. Depending upon the type of PSP integration, either the middleware 250, or the POS 200 will in turn then formulate a message and communicates the network token 600 to a PSP system 300 to orchestrate a credit card payment. The PSP system 300 formulates a message with the network token 600 and communicates to an acquirer 203 to orchestrate the payment. The result of the payment is returned back through the chain of components to POS 200.

Figure 8:
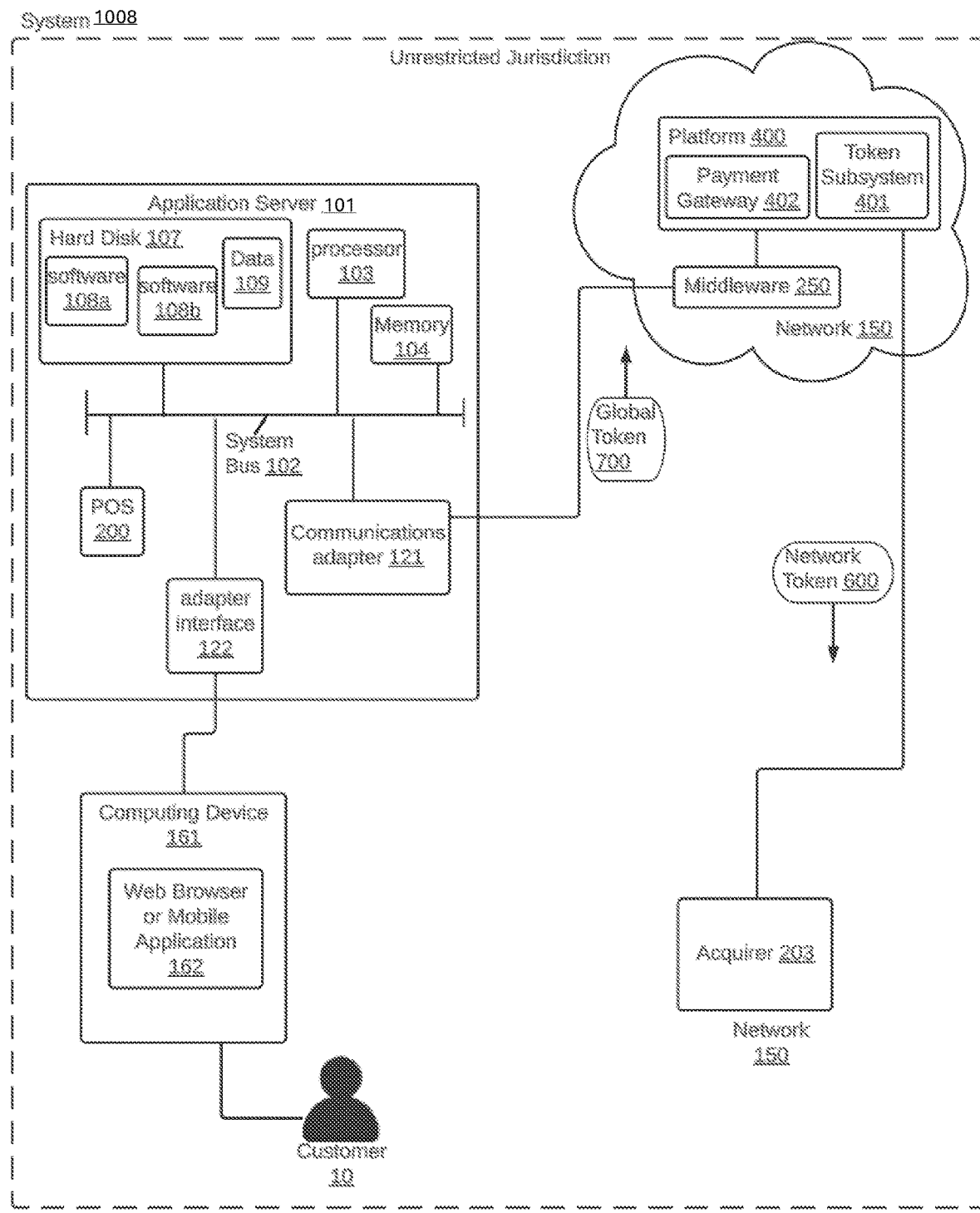
FIG. 8 depicts a process flow of an on-line POS system integrated to the middleware to orchestrate a payment, regardless of location, in accordance with one or more embodiments.

Turning now to FIG. 8, a system 1008 is depicted for implementing on-line card not present processing for ecom and mobile applications, fully integrated between the POS 200, middleware 250, a customer's computing device 161, the web browser or mobile application 162, platform 400 with payment gateway 402, and acquirer 203, for exchanging a global token 700 for a network token 600 to facilitate a credit card payment, outside of a restricted jurisdiction. The system 1008 is an example configuration of the system 100 of FIG. 1.

The system 1008 has an application server 101. The POS 200 software resides and is running on the application server 101 performing POS functions. The POS 200 software may be a web application that interacts with a web browser on the computing device 161, or may be the server side application communicating with the mobile application 162 on the computing device 161, to interface with the Customer 10. The customer 10 initiates a payment request to the POS 200 application. The POS 200 software communicates to the middleware 250, hosted on a platform outside of the application server 101, to execute a payment by sending a global token 700. The middleware 250 formulates a message and communicates to platform 400, sending the global token 700 and instructions to execute the payment with a network token 600. Platform 400 in turn communicates to the payment gateway 402, which in turn communicates to the token subsystem 401, exchanging the global token 700 for a network token 600. The token subsystem 401 returns the network token 600 to the payment gateway 402, which in turn formulates a message and communicates to the acquirer 203, sending the network token 600, to execute the credit card payment. The result of the payment is returned back through the chain of components to POS 200.

Figure 9:
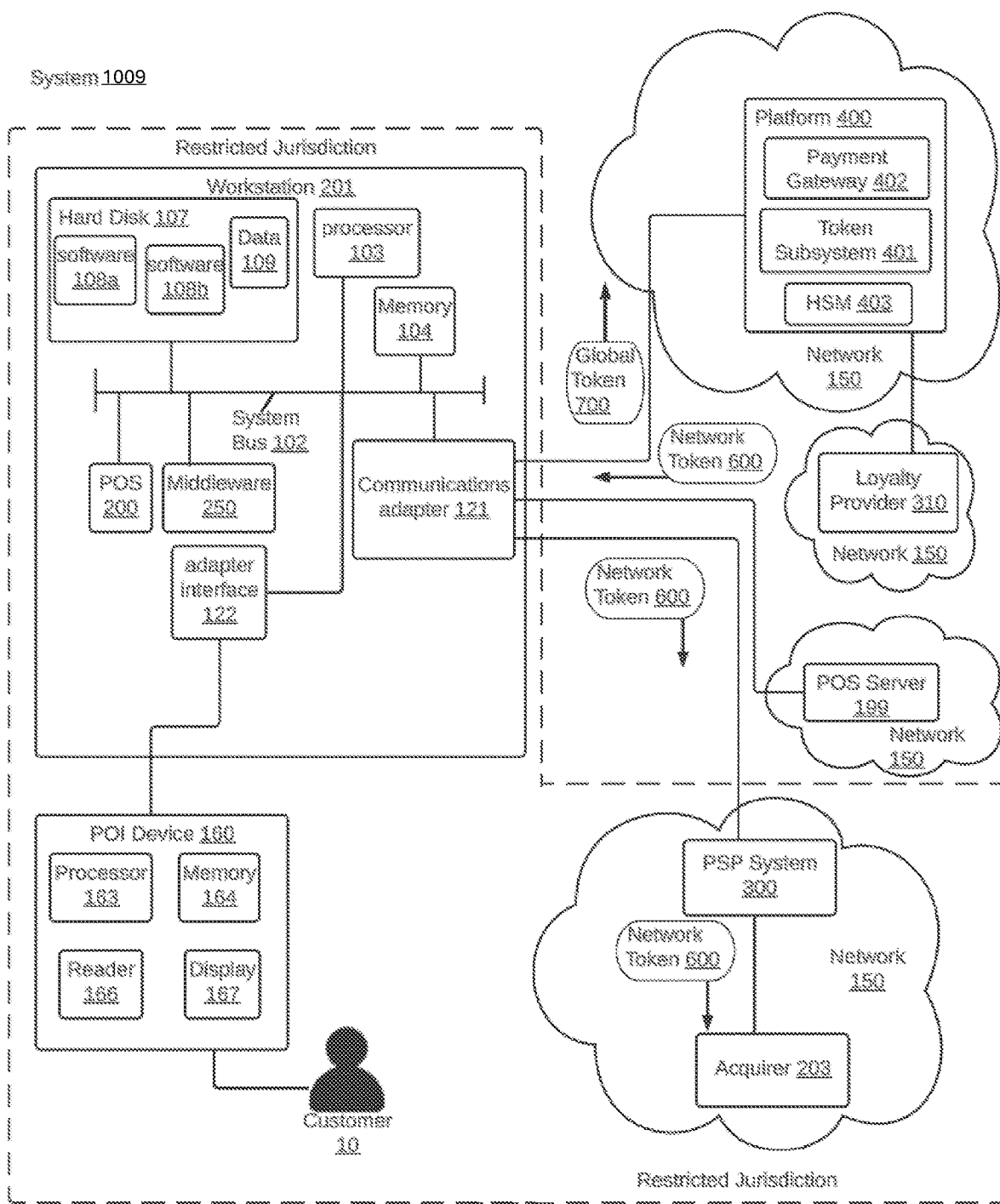
FIG. 9 depicts a process flow of a POS system integrated to the middleware to orchestrate earning or redeeming units linked to the PAN inside a restricted jurisdiction in accordance with one or more embodiments.

Turning now to FIG. 9, a system 1009 is depicted for implementing payment orchestration, fully integrated between the POS 200, middleware 250, POS server 199, POI device 160, platform 400, a payment service provider (PSP) system 300, and acquirer 203, for exchanging a global token 700 for a network token 600 to facilitate a credit card payment, as well as a loyalty transaction, from within a restricted jurisdiction. The system 1009 is an example configuration of the system 100 of FIG. 1.

The system 1009 has a workstation 201. The POS 200 software resides and is running on the workstation 201 performing POS functions. The POS 200 software communicates to the middleware 250 to exchange a global token 700, for a network token 600. The middleware 250 formulates a message and communicates to platform 400, sending the global token 700, which in turn communicates to the token subsystem 401, exchanging the global token 700 for a network token 600. The platform 400 then returns the network token 600 to the middleware 250. Depending upon the type of PSP integration, either the middleware 250, or the POS 200 will in turn then formulate a message and communicates the network token 600 to a PSP system 300 to orchestrate a credit card payment. The PSP system 300 formulates a message with the network token 600 and communicates to an acquirer 203 to orchestrate the payment. The results of the payment operation are returned back through to the middleware 250 and/or POS 200. The middleware 250, being configured to also perform loyalty transactions, will formulate a message and communicate to platform 400, sending the same global token 700, with instructions to perform a loyalty transaction, such as earning points. Platform 400 retrieves the loyalty account from the token subsystem 401 using the global token 700, and in turn formulates a message and communicates to a loyalty provider 310 to execute the loyalty transaction. The result of the loyalty transaction is returned back through the chain of components to the POS 200. The loyalty account must have been provided upon provisioning a global token from a network token prior to the loyalty transaction request.

Figure 10:
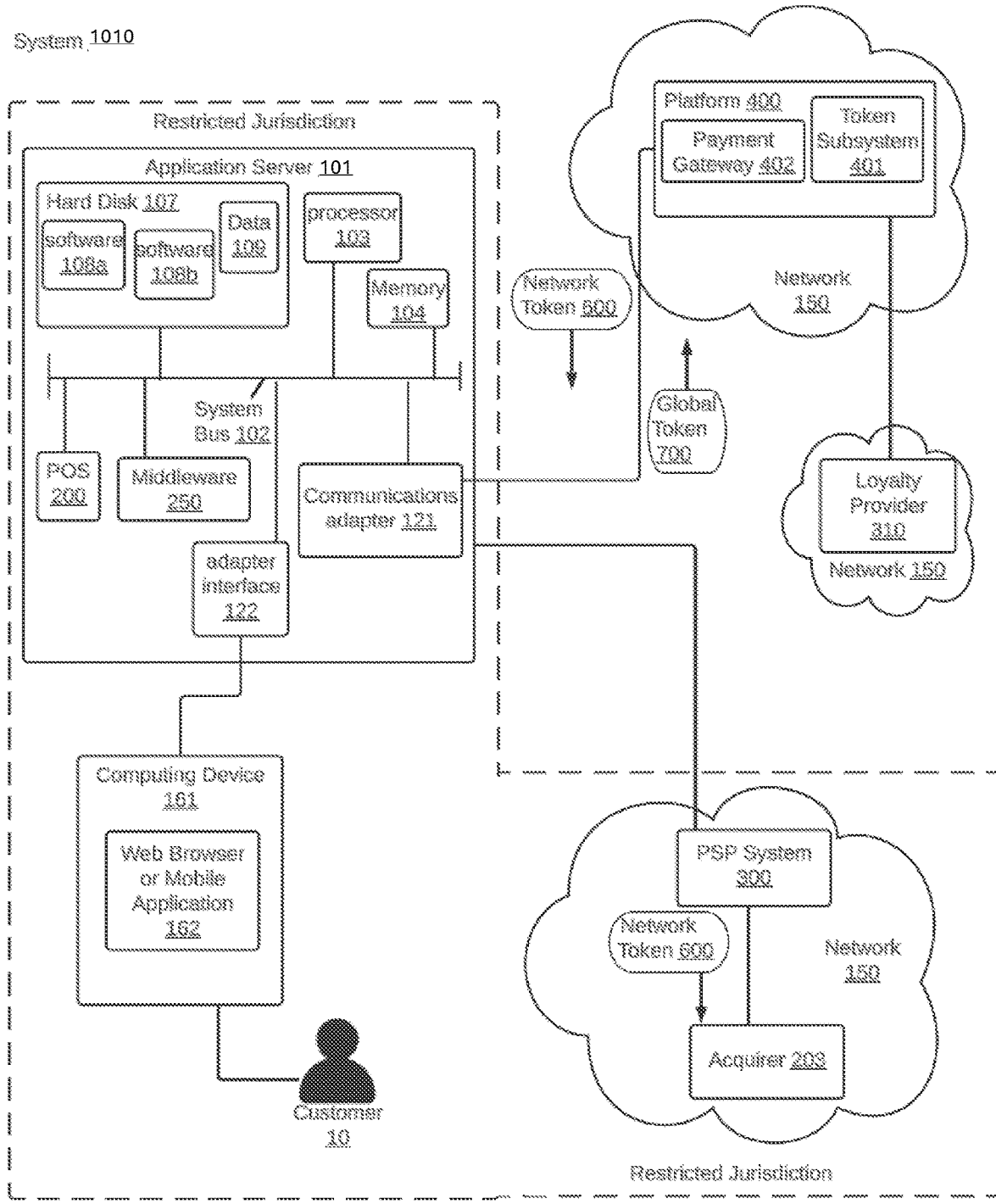
FIG. 10 depicts a process flow of an on-line POS system integrated to the middleware to orchestrate earning or redeeming units linked to the PAN inside a restricted jurisdiction in accordance with one or more embodiments.

Turning now to FIG. 10, a system 1010 is depicted for implementing on-line card not present processing for ecom and mobile applications, fully integrated between the POS 200, middleware 250, a customer's computing device 161, the web browser or mobile application 162, platform 400, a payment service provider (PSP) system 300, and acquirer 203, for exchanging a global token 700 for a network token 600 to facilitate a credit card payment, as well as a loyalty transaction, from within a restricted jurisdiction. The system 1010 is an example configuration of the system 100 of FIG. 1.

The system 1010 has an application server 101. The POS 200 software resides and is running on the application server 101 performing POS functions. The POS 200 software may be a web application that interacts with a web browser on the computing device 161, or may be the server side application communicating with the mobile application 162 on the computing device 161, to interface with the customer 10.

The customer 10 initiates a payment request to the POS 200 application. The POS 200 software communicates to the middleware 250 to exchange a global token 700, for a network token 600. The middleware 250 formulates a message and communicates to platform 400, sending the global token 700, which in turn communicates to the token subsystem 401, exchanging the global token 700 for a network token 600. The platform 400 then returns the network token 600 to the middleware 250. Depending upon the type of PSP integration, either the middleware 250, or the POS 200 will in turn then formulate a message and communicates the network token 600 to a PSP system 300 to orchestrate a credit card payment. The PSP system 300 formulates a message with the network token 600 and communicates to an acquirer 203 to orchestrate the payment. The results of the payment operation are returned back through to the middleware 250 and/or POS 200. The middleware 250, being configured to also perform loyalty transactions, will formulate a message and communicate to platform 400, sending the same global token 700, with instructions to perform a loyalty transaction, such as earning points. Platform 400 retrieves the loyalty account from the token subsystem 401 using the global token 700, and in turn formulates a message and communicates to a loyalty provider 310 to execute the loyalty transaction. The result of the loyalty transaction is returned back through the chain of components to the POS 200. The loyalty account must have been provided upon provisioning a global token from a network token prior to the loyalty transaction request.

Figure 11:
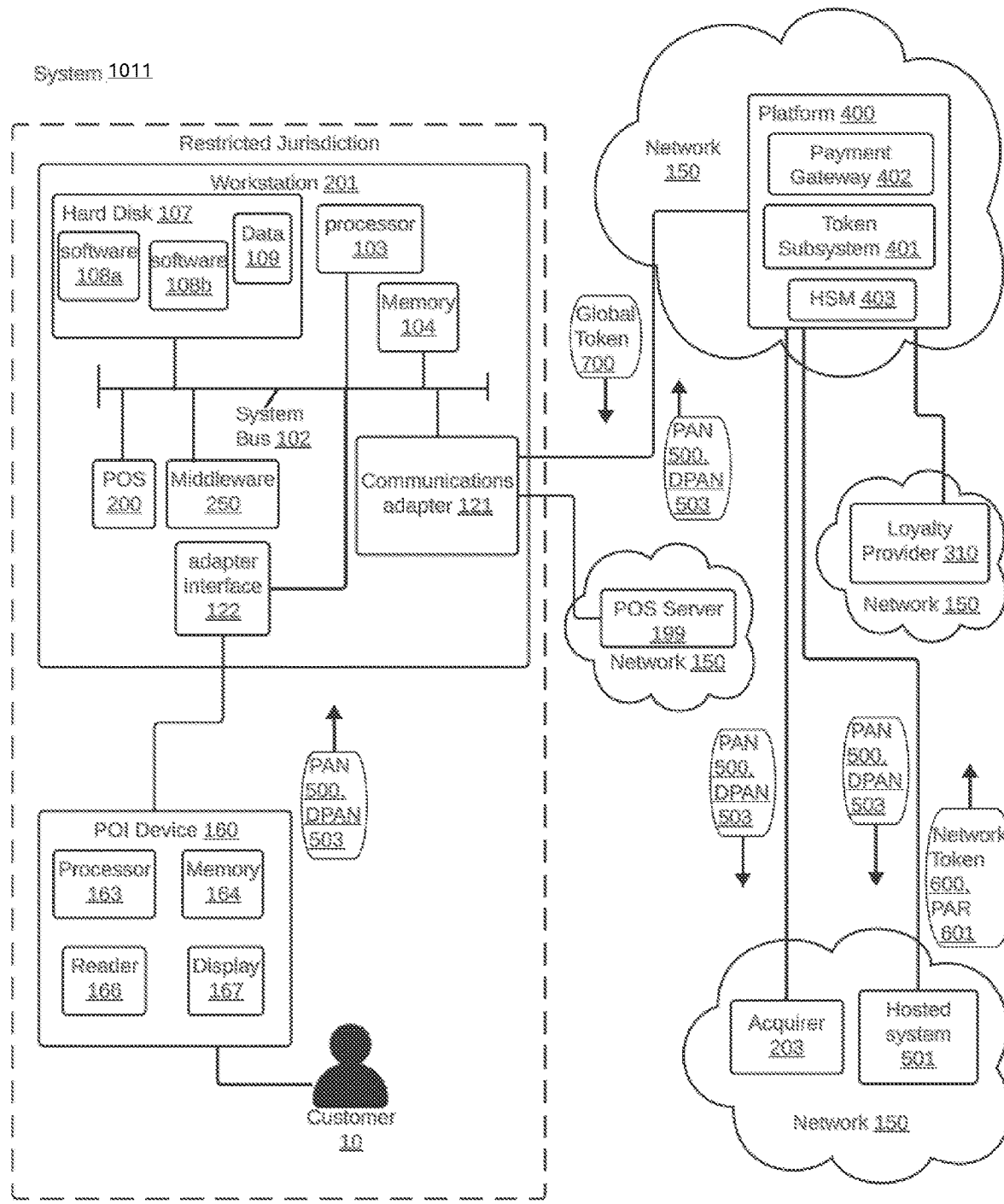
FIG. 11 depicts a process flow of a POS system integrated to the middleware to orchestrate earning or redeeming units linked to the PAN in accordance with one or more embodiments.

Turning now to FIG. 11, a system 1011 is depicted for implementing card present payment and tokenization process, coupled with a loyalty transaction, synchronously, fully integrated between the POS 200, Middleware 250, POI device 160, hosted system 501, and platform 400, and acquirer 203, with securely transmitting the PAN 500 or DPAN 503, when the credit card is read and encrypted, leveraging PCI validated P2PE. The system 1011 is an example configuration of the system 100 of FIG. 1.

The system 1011 has a workstation 201. The POS 200 software sends a payment, loyalty, and global tokenization message, all in one, to the middleware 250 to in turn communicate to the POI device 160 to be ready to accept a credit card read. The customer 10 inserts, taps, or manually enters their credit card, or taps their phone with the digital wallet, for executing the POS 200 request. The POI device 160 securely obtains the PAN 500 or DPAN 503, encrypts the PAN 500 or DPAN 503, and provides the encrypted data to the middleware 250. The middleware 250 forms a specific message and communicates to platform 400. Platform 400, leveraging the payment gateway 402, decrypts the payload retrieving the PAN 500 or DPAN 503 from the HSM 403, then formulates a message and communicates to the acquirer 203, sending the PAN 500 or DPAN 503 to execute a payment. The result of the payment is returned to the payment gateway 402, and if it was successfully accepted by the acquirer, the payment gateway 402 then communicates to the token subsystem 401 to provision a network token 600, and return a merchant specific global token 700. The token subsystem formulates a message and communicates to the hosted system 501, sending the PAN 500 or DPAN 503. The hosted system 501 provisions a network token 600, and returns the network token 600 and the PAR 601 back to the token subsystem 401. The token subsystem 401 stores the network token 600, the PAR 601, then generates and returns the global token 700 back to the payment gateway 402, which in turn returns the result of the payment as well as the global token 700 back to the middleware 250. The middleware 250, having been configured for loyalty and having received the initial POS 200 message to execute loyalty, will formulate a message and send the loyalty transaction request, with the global token 700 to the platform 400. Platform 400 formulates a message and communicates to the token subsystem, passing in the global token 700. The token subsystem retrieves the PAR value, linked with the global token 700, from the previously provisioned network token 600, and looks up the loyalty account using the PAR value and returns the loyalty account back to the payment gateway 402. The payment gateway formulates a message and communicates the loyalty transaction, with the loyalty account, to the loyalty provider 310. The results of the loyalty transaction is returned back through the chain of components to the middleware 250, which in turn returns the payment result, global token 700, and the loyalty transaction result to the POS 200. The loyalty account must have been provided in a previous operation when a customer has stored their credit card on file for future use in the token subsystem 401. The PAR value would have also been provided and stored, linked to the loyalty account as well.

Loyalty accounts may represent any type of user tracking and association system with secure transaction support. Such user tracking and association systems can manage various types of units that are associated with a user account and may be increased or decreased based on various types of actions.

Figure 12:
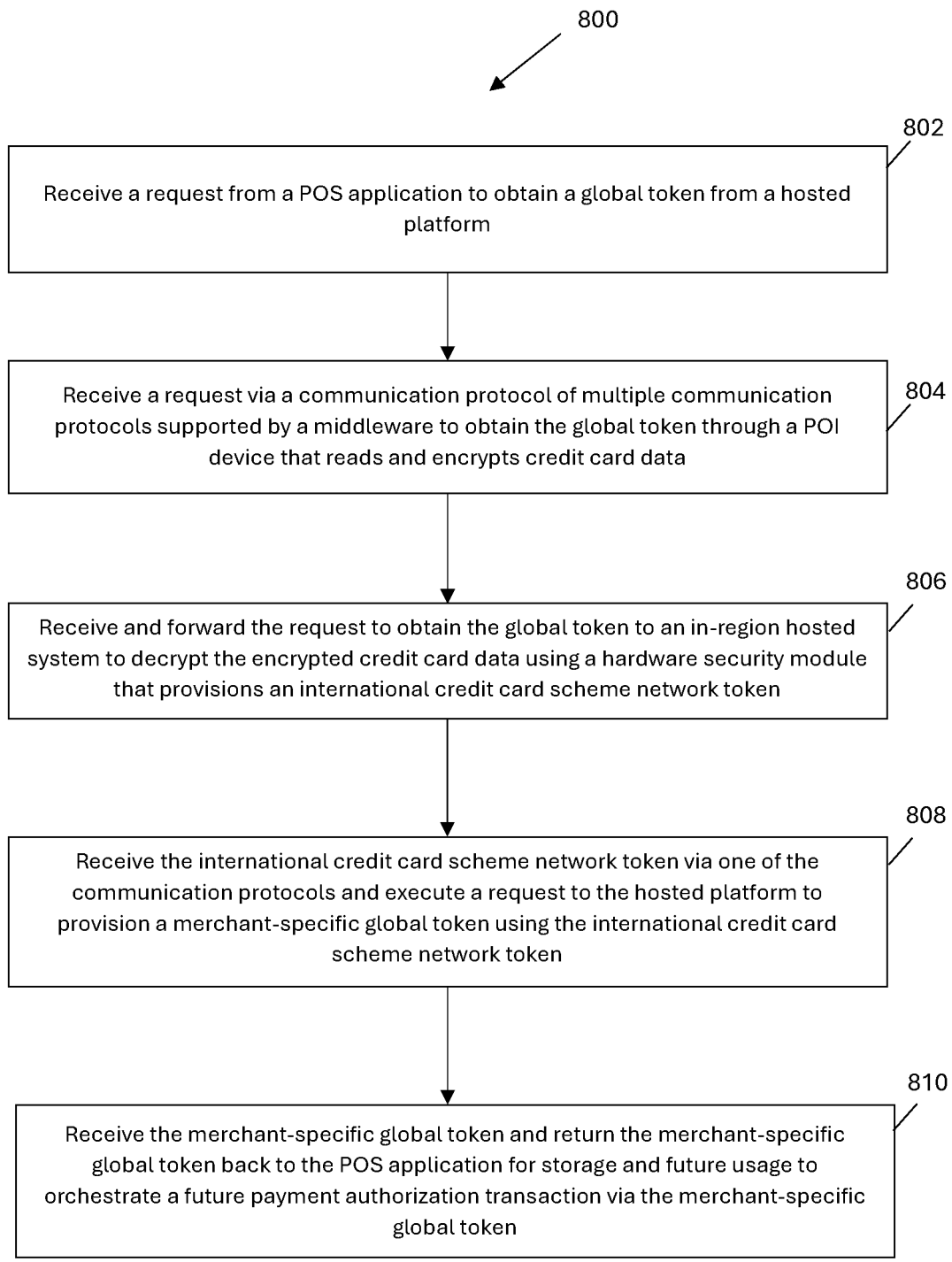
FIG. 12 depicts a process flow in accordance with one or more embodiments.

Turning now to FIG. 12, a flowchart of a method 800 is generally shown in accordance with one or more aspects. All or a portion of method 800 can be a computer-implemented method that is implemented, for example, by all or a portion of the systems of FIGS. 1-11.

At block 802, the middleware 250 can receive a request from a POS application 200 to obtain a global token from a hosted platform. At block 804, the middleware 250 can receive a request via a communication protocol of multiple communication protocols supported by the middleware 250 to obtain the global token through a POI device that reads and encrypts credit card data. At block 806, the middleware 250 can receive and forward the request to obtain the global token to an in-region hosted system to decrypt the encrypted credit card data using a hardware security module that provisions an international credit card scheme network token. At block 808, the middleware 250 can receive the international credit card scheme network token via one of the communication protocols and execute a request to the hosted platform to provision a merchant-specific global token using the international credit card scheme network token. At block 810, the middleware 250 can receive the merchant-specific global token and return the merchant-specific global token back to the POS application 200 for storage and future usage to orchestrate a future payment authorization transaction via the merchant-specific global token.

In some aspects, the POS application 200 and middleware 250 can be executable by a workstation 201.

In some aspects, the workstation 201 can be configured to interface with the hosted platform used to perform both payments and global tokenization services inside, or outside, of a restricted jurisdiction for primary account number (PAN) export and storage, and a hosted network token provisioning system.

In some aspects, computer program instructions that when executed by one or more processors (e.g., processor 103) can cause the one or more processors to implement receiving an encrypted credit card number from the POI device 160 that recognizes a POI device type, automatically connects and communicates based on the POI device type, initiates a command to accept a credit card read or a manually entered credit card number, and encrypts the credit card number, within a payment card industry (PCI) validated point-point encryption (P2PE) solution, recognizing the communication protocol of the hosted network token provisioning system, constructing an information, including the encrypted card number, and transmitting the information to the hosted network token provisioning system to decrypt the information and provision a network token, and in turn is exchanged for the merchant-specific global token.

In some aspects, source code of the middleware 250 can be configured to be compiled and run on a variety of workstation operation systems.

In some aspects, the middleware 250 can include multiple communication interfaces, each of the multiple communication interfaces corresponding to one of the multiple communication protocols.

In some aspects, the middleware 250 can be POS and POI device agnostic.

In some aspects, the POS application 200 and middleware 250 can be executable by an application server 101.

In some aspects, computer program instructions that when executed by the one or more processors (e.g., processor 103) can cause the one or more processors to implement transmitting a plurality of instructions to the hosted platform used for merchant specific global token provisioning, when requesting a token, to identify a user account number linked to the credit card account number obtained from the POI device, using a network token, and subsequently communicate to a platform with a user account and payment information, interrogating the user account and payment information to determine whether the user account is eligible for accruing units and/or eligible to redeem units based on information returned to the hosted platform, receiving information on a plurality of options for accrual and/or redemption from the hosted platform, and presenting to a customer associated with the credit card account number one or more of the options.

In some aspects, the one or more of the options can include presenting to the customer associated with the credit card account number, a number of units earned for an associated payment transaction, such as on display 167.

In some aspects, the one or more of the options can include redeeming or accruing units instead of completing a credit card payment or in addition to the credit card payment.

In some aspects, computer program instructions that when executed by the one or more processors (e.g., processor 103) can cause the one or more processors to implement receiving input from the customer, transmitting an accrual or redemption request back to the hosted platform to subsequently communicate to the platform, the units of accrual or redemption, receiving a response back from the hosted platform, displaying, on the POI device, the number of units accrued or redeemed, and returning a result to the POS application to add to an order and receipt.

The processing shown in FIG. 12 is not intended to indicate that the operations are to be executed in any particular order or that all of the operations shown in FIG. 12 are to be included in every case. Additionally, the processing shown in FIG. 12 can include any suitable number of additional operations.

According to aspects, an integrated selling system platform can include a point of sale application and a global tokenization orchestration middleware to perform global tokenization orchestration, that in combination, provide credit card reading device agnostic global token, and provisioning operations, and/or credit card linked loyalty operations. The middleware includes communication interfaces, each of which corresponds to a particular communication protocol. The middleware receives a token create request from the point of sale application and directly communicates, via one of the communication protocols, to a point of interaction payment device, to receive and securely encrypt the credit card number, then transmit that information to a hosted network token provisioning system to request a network token. Upon receiving the network token, communicates directly, via one or more protocols, to a global merchant tokenization host, to create a merchant specific token, to be returned by the middleware back to the point of sale client to use as a card-on-file payment method. Through the same protocol, the middleware may instruct the global token host to also retrieve the linked loyalty account to that credit card, using the network token and primary account reference value, communicate to a third system to determine loyalty unit accrual and/or redemption options, and return that information back to the middleware for orchestration of loyalty accrual or redemption, of specific unit amounts, based on the customer's input. The middleware also comprises a method for receiving a merchant specific global token, detokenize that token with the global merchant tokenization host, receive back the network token associated with that merchant token, to then be used for a credit card payment authorization from any location globally, ensuring that the merchant abides by all local and regional data governance laws in accordance with transmitting and storing credit card account numbers.

In some aspects, a computer-implemented method, within a middleware of an integrated selling system platform, to provide a credit card account number linked with a loyalty account can include transmitting a plurality of instructions to a hosted platform used for merchant specific global token provisioning, when requesting a token, to identify a loyalty account number linked to the credit card account number obtained from a point-of-interaction (POI) device, using a network token, and subsequently communicate to a loyalty platform with the loyalty account and payment information. The computer-implemented method can also include interrogating loyalty account and payment information to determine whether the loyalty account is eligible for accruing loyalty units and/or eligible to redeem loyalty units based on information returned to the hosted platform. The computer-implemented method can further include receiving information on options for loyalty accrual and/or redemption from the hosted platform. The computer-implemented method can additionally include presenting to a customer associated with the credit card account number, a number of loyalty units automatically earned for an associated payment transaction, or presenting an option to the customer to redeem or accrue loyalty units instead of completing a credit card payment, or in addition to a credit card payment, to complete the order of the POS. This can assist in ensuring that the merchant abides by all local and regional data governance laws in accordance with transmitting and storing credit card account numbers while providing secure transactions.

In some aspects, the computer-implemented method can include receiving input from the customer and transmitting a loyalty accrual or redemption request back to the hosted platform to subsequently communicate to the loyalty platform, the loyalty units of accrual or redemption. The computer-implemented method can also include receiving a response back from the hosted platform, displaying, on the POI device, the number of loyalty units accrued or redeemed, and returning a result to a point-of-sale (POS) application to add to an order and receipt.

Aspects disclosed herein may be a system, a method, and/or a computer program product at any possible technical detail level of integration. The computer program product may include a computer-readable storage medium (or media) having computer-readable program instructions thereon for causing a processor to carry out various aspects.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language, such as Smalltalk, C++, high-level languages such as Python, C-Sharp (C#), Java, Swift, Objective C, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present disclosure.

Aspects are described herein with reference to flowchart illustrations and/or block diagrams of methods, apparatus (systems), and computer program products according to aspects of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer system, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects have been presented for purposes of illustration but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects described herein.

Various aspects are described herein with reference to the related drawings. Alternative aspects can be devised without departing from the scope of this disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains," or "containing," or any other variation thereof are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any aspect or design described herein as "exemplary" is not necessarily to be construed as preferred or advantageous over other aspects or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof are intended to include the degree of error associated with measurement of the particular quantity based upon the equipment available at the time of filing the application. For example, "about" can include a range of +8% or 5%, or 2% of a given value.

For the sake of brevity, conventional techniques related to making and using aspects may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It should be understood that various aspects, and/or parts of the aspects, disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium, such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), graphics processing units (GPUs), microprocessors, application-specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

While the invention has been described with reference to aspects, it should be understood by those skilled in the art that various changes may be made and equivalents may be substituted for elements thereof without departing from the scope of the invention. Moreover, the aspects or parts of the aspects may be combined in whole or in part without departing from the scope of the invention. In addition, many modifications may be made to adapt a particular situation or material to the teachings of the invention without departing from the scope thereof. Therefore, it is intended that the invention not be limited to the particular aspects disclosed as contemplated for carrying out this invention, but that the invention will include all aspects falling within the scope of the appended claims. Moreover, unless specifically stated any use of the terms first, second, etc. do not denote any order or importance, but rather the terms first, second, etc. are used to distinguish one element from another.

What is claimed is:

1. A computer-implemented method, within a middleware of an integrated selling system platform, to provide a credit card account number linked with a loyalty account comprising:
   receiving, by the middleware, a request from a point-of-sale (POS) application to execute a loyalty transaction and obtain a global token from a hosted platform;
   receiving, by the middleware, a request via one of a plurality of communication protocols to obtain the global token through a point-of-interaction (POI) device that reads and encrypts credit card data;
   receiving and forwarding, by the middleware, an encrypted credit card number to an in-region hosted system for decryption using a hardware security module that provisions an international credit card scheme network token;
   receiving, by the middleware, the international credit card scheme network token via one of the plurality of communication protocols;

executing, by the middleware, a request to the hosted platform to provision a merchant-specific global token using the international credit card scheme network token;

receiving, by the middleware, the merchant-specific global token;

generating and sending, by the middleware, a loyalty transaction request and the merchant-specific global token to the hosted platform;

receiving, by the middleware, a result of the loyalty transaction; and sending, by the middleware, the loyalty transaction result and the merchant-specific global token to the POS application for storage and future usage to orchestrate a future payment authorization transaction via the merchant-specific global token.

2. The computer-implemented method of claim 1, wherein generating the loyalty transaction request comprises:

transmitting a plurality of instructions to the hosted platform to identify a user account number linked to the credit card account number, using the international credit card scheme network token, and subsequently communicating to a platform with a user account and payment information;

interrogating the user account and payment information to determine whether the user account is eligible for accruing units and/or eligible to redeem units based on information returned to the hosted platform;

receiving information on a plurality of options for accrual and/or redemption from the hosted platform; and presenting to a customer associated with the credit card account number one or more of the options.

3. The computer-implemented method of claim 2, wherein the one or more of the options comprise presenting to the customer associated with the credit card account number, a number of units earned for an associated payment transaction.

4. The computer-implemented method of claim 2, wherein the one or more of the options comprise redeeming or accruing units instead of completing a credit card payment or in addition to the credit card payment.

5. The computer-implemented method of claim 2, wherein generating the loyalty transaction request further comprises:

receiving input from the customer;

transmitting an accrual or redemption request back to the hosted platform to subsequently communicate, to the platform, units of accrual or redemption;

receiving a response from the hosted platform; and displaying, on the POI device, a number of units accrued or redeemed.

6. An integrated selling system platform with integrated global tokenization orchestration middleware, comprising:

a workstation comprising one or more processors and a memory system comprising a plurality of instructions executable by the one or more processors to provide a point-of-sale (POS) application and a middleware, wherein source code of the middleware is configured to be compiled and run on a variety of workstation operation systems, and the middleware comprises multiple communication interfaces, each of the multiple communication interfaces corresponding to one of a plurality of communication protocols, and the middleware is POS and point-of-interaction (POI) device agnostic;

wherein the workstation is configured to interface with a hosted platform used to perform both payments and global tokenization services inside, or outside, of a restricted jurisdiction for primary account number (PAN) export and storage, and a hosted network token provisioning system; and wherein the instructions, when executed by the one or more processors, cause the one or more processors to implement:

receiving, by the middleware, a request from the point-of-sale (POS) application to execute a loyalty transaction and obtain a global token from a hosted platform;

receiving, by the middleware, a request via one of the plurality of communication protocols to obtain the global token through a point-of-interaction (POI) device that reads and encrypts credit card data;

receiving and forwarding, by the middleware, an encrypted credit card number to an in-region hosted system for decryption using a hardware security module that provisions an international credit card scheme network token;

receiving, by the middleware, the international credit card scheme network token via one of the plurality of communication protocols;

executing, by the middleware, a request to the hosted platform to provision a merchant-specific global token using the international credit card scheme network token;

receiving, by the middleware, the merchant-specific global token;

generating and sending, by the middleware, a loyalty transaction request and the merchant-specific global token to the hosted platform;

receiving, by the middleware, a result of the loyalty transaction; and sending, by the middleware, the loyalty transaction result and the merchant-specific global token to the POS application for storage and future usage to orchestrate a future payment authorization transaction via the merchant-specific global token.

7. The integrated selling system platform of claim 6, wherein receiving and forwarding, by the middleware, the encrypted credit card number comprises:

receiving an encrypted credit card number from the POI device that recognizes a POI device type, automatically connects and communicates based on the POI device type, initiates a command to accept a credit card read or a manually entered credit card number, and encrypts the credit card number, within a payment card industry (PCI) validated point-point encryption (P2PE) solution;

recognizing a communication protocol of the hosted network token provisioning system;

constructing an information, including the encrypted card number; and transmitting the information to the hosted network token provisioning system to decrypt the information and provision the international credit card scheme network token.

8. A computer program product comprising a non-transitory storage medium embodied with computer program instructions that when executed by one or more processors cause the one or more processors to implement:

receiving, by a middleware, a request from a point-of-sale (POS) application to execute a loyalty transaction and obtain a global token from a hosted platform;

receiving, by the middleware, a request via one of a plurality of communication protocols to obtain the global token through a point-of-interaction (POI) device that reads and encrypts credit card data;

receiving and forwarding, by the middleware, an encrypted credit card number to an in-region hosted system for decryption using a hardware security module that provisions an international credit card scheme network token;

receiving, by the middleware, the international credit card scheme network token via one of the plurality of communication protocols;

executing, by the middleware, a request to the hosted platform to provision a merchant-specific global token using the international credit card scheme network token;

receiving, by the middleware, the merchant-specific global token;

generating and sending, by the middleware, a loyalty transaction request and the merchant-specific global token to the hosted platform;

receiving, by the middleware, a result of the loyalty transaction; and sending, by the middleware, the loyalty transaction result and the merchant-specific global token to the POS application for storage and future usage to orchestrate a future payment authorization transaction via the merchant-specific global token.

9. The computer program product of claim 8, wherein the POS application and middleware are executable by a workstation.

10. The computer program product of claim 9, wherein the workstation is configured to interface with the hosted platform used to perform both payments and global tokenization services inside, or outside, of a restricted jurisdiction for primary account number (PAN) export and storage, and a hosted network token provisioning system.

11. The computer program product of claim 10, wherein receiving and forwarding, by the middleware, the encrypted credit card number comprises:
   receiving an encrypted credit card number from the POI device that recognizes a POI device type, automatically connects and communicates based on the POI device type, initiates a command to accept a credit card read or a manually entered credit card number, and encrypts the credit card number, within a payment card industry (PCI) validated point-point encryption (P2PE) solution;
   recognizing a communication protocol of the hosted network token provisioning system;
   constructing an information, including the encrypted card number; and
   transmitting the information encrypted credit card data to the hosted network token provisioning system to decrypt the information and provision the international credit card scheme network token, and in turn is exchanged for the merchant-specific global token.

12. The computer program product of claim 9, wherein source code of the middleware is configured to be compiled and run on a variety of workstation operation systems.

13. The computer program product of claim 9, wherein the middleware comprises multiple communication interfaces, each of the multiple communication interfaces corresponding to one of the plurality of communication protocols.

14. The computer program product of claim 13, wherein the middleware is POS and POI device agnostic.

15. The computer program product of claim 8, wherein the POS application and the middleware are executable by an application server.

16. The computer program product of claim 8, wherein generating the loyalty transaction request comprises:
   transmitting a plurality of instructions to the hosted platform to identify a user account number linked to a credit card account number, using the international credit card scheme network token, and subsequently communicating to a platform with a user account and payment information;
   interrogating the user account and payment information to determine whether the user account is eligible for accruing units and/or eligible to redeem units based on information returned to the hosted platform;
   receiving information on a plurality of options for accrual and/or redemption from the hosted platform; and
   presenting to a customer associated with the credit card account number one or more of the options.

17. The computer program product of claim 16, wherein the one or more of the options comprise presenting to the customer associated with the credit card account number, a number of units earned for an associated payment transaction.

18. The computer program product of claim 16, wherein the one or more of the options comprise redeeming or accruing units instead of completing a credit card payment or in addition to the credit card payment.

19. The computer program product of claim 16, wherein generating the loyalty transaction request further comprises:
   receiving input from the customer;
   transmitting an accrual or redemption request back to the hosted platform to subsequently communicate, to the platform, units of accrual or redemption;
   receiving a response back from the hosted platform; and
   displaying, on the POI device, a number of units accrued or redeemed.

* * * * *